(12) United States Patent
Lee et al.

(10) Patent No.: US 12,437,872 B2
(45) Date of Patent: Oct. 7, 2025

(54) AUTONOMOUS MEDICAL SCREENING AND RECOGNITION ROBOTS, SYSTEMS AND METHOD OF IDENTIFYING A DISEASE, CONDITION, OR INJURY

(71) Applicant: Planned Systems International, Inc., Arlington, VA (US)

(72) Inventors: June Lee, North Bethesda, MD (US); Thomas J Berti, Lusby, MD (US); Yan Li, Bethesda, MD (US)

(73) Assignees: Planned Systems International, Inc., Arlington, VA (US); National Society of Medical Scientists, Bethesda, MD (US)

( * ) Notice: Subject to any disclaimer, the term of this patent is extended or adjusted under 35 U.S.C. 154(b) by 448 days.

(21) Appl. No.: 17/957,694

(22) Filed: Sep. 30, 2022

(65) Prior Publication Data

US 2023/0402179 A1 Dec. 14, 2023

Related U.S. Application Data

(63) Continuation-in-part of application No. 17/894,764, filed on Aug. 24, 2022, and a continuation-in-part of application No. 17/870,621, filed on Jul. 21, 2022, and a continuation-in-part of application No.
(Continued)

(51) Int. Cl.
*G16H 50/20* (2018.01)
*G16H 10/60* (2018.01)
*G16H 20/00* (2018.01)
*G16H 40/67* (2018.01)

(52) U.S. Cl.
CPC ............ *G16H 50/20* (2018.01); *G16H 10/60* (2018.01); *G16H 20/00* (2018.01); *G16H 40/67* (2018.01)

(58) Field of Classification Search
None
See application file for complete search history.

(56) References Cited

U.S. PATENT DOCUMENTS

| | | |
|---|---|---|
| 2011/0130636 A1 | 6/2011 | Daniel et al. |
| 2016/0244163 A1 | 8/2016 | Peeters et al. |
| 2017/0092109 A1* | 3/2017 | Trundle ................. G05D 1/104 |

(Continued)

OTHER PUBLICATIONS

Sahashi et al. ("A study of operational liability of the medical rescue robot under disaster," 2011 IEEE/SICE International Symposium on System Integration (SII), Kyoto, Japan, 2011, pp. 1281-1286) (Year: 2011).*

(Continued)

*Primary Examiner* — Christopher B Tokarczyk

(57) ABSTRACT

Systems, methods, and other embodiments relate to autonomous screening and diagnosis using a screening robot. In at least one approach, a method includes generating, using a learning model, a diagnosis for a patient according to health information acquired from at least the screening robot. The health information including sensor data about the patient and perceptions derived from the sensor data. The method includes, responsive to determining that the diagnosis is incomplete, generating a request for additional information and updating the diagnosis according to the additional information. The method includes providing the diagnosis to facilitate treatment of the patient.

20 Claims, 9 Drawing Sheets

Related U.S. Application Data

17/836,264, filed on Jun. 9, 2022, now Pat. No. 12,283,378.

(60) Provisional application No. 63/390,816, filed on Jul. 20, 2022.

(56) References Cited

U.S. PATENT DOCUMENTS

| | | |
|---|---|---|
| 2019/0008598 A1 | 1/2019 | Frimer et al. |
| 2019/0262084 A1 | 8/2019 | Roh et al. |
| 2020/0027560 A1* | 1/2020 | Ling ................ G16H 10/60 |
| 2020/0035335 A1* | 1/2020 | Kivatinos ............ G06F 17/16 |
| 2020/0098461 A1* | 3/2020 | Macoviak ........... G06Q 30/018 |
| 2020/0111578 A1 | 4/2020 | Koblick et al. |
| 2020/0338309 A1 | 10/2020 | Kopperschmidt et al. |
| 2021/0327578 A1* | 10/2021 | Buchard ............. G16H 50/30 |
| 2022/0037039 A1 | 2/2022 | Wein |
| 2022/0047339 A1 | 2/2022 | Prior et al. |

OTHER PUBLICATIONS

Yip et al., "Robot Autonomy for Surgery", World Scientific Review, arXiv preprint arXiv:1707.03080, 2017, 33 pages.

Sahashi, et al., "A study of operational liability of the medical rescue robot under disaster," 2011 IEEE/SICE International Symposium on System Integration (SII), 2011, 6 pages.

* cited by examiner

100
AUTONOMOUS MEDICAL BIOSIGNAL AND BIOIMAGE EXTRACTION, PROCESSING, AND ANALYSIS BY ROBOT

AUTONOMOUS MEDICAL SCREENING AND RECOGNITION ROBOTS, SYSTEMS AND METHOD OF IDENTIFYING A DISEASE, CONDITION, OR INJURY

CROSS-REFERENCE TO RELATED APPLICATIONS

This application is a continuation in part of and claims the benefit of U.S. Non-Provisional application Ser. No. 17/894,764, filed on Aug. 24, 2022, which claims priority to U.S. Provisional Application No. 63/390,816 filed on Jul. 20, 2022, and which is a continuation in part of U.S. Non-Provisional application Ser. No. 17/836,264, filed on Jun. 9, 2022, and U.S. Non-Provisional application Ser. No. 17/870,621, filed on Jul. 21, 2022, which are all herein incorporated by reference in their entirety.

TECHNICAL FIELD

The present disclosure relates in one aspect to the autonomous medical screening and diagnosis of patients and, in particular, to using autonomous systems to coordinate screening and diagnosis.

BACKGROUND

Medical screening and assessment, including physical and clinical assessment, involves determining a diagnosis for a patient in need and the urgency by which a patient needs to be treated. In general, the process of medical screening/diagnosis assigns a relative priority to a patient according to a determination derived from clinical evidence (i.e., known states of the patient). Medical screening is of paramount importance when providing healthcare as the diagnosis/assessment permits the correct allocation of resources and treatment of a patient. Further, the process of disease identification is strongly associated with the ability to accurately correlate the symptoms, signs, and test results as clinical evidence. However, the acquisition and correlation of this information is generally a manual task that involves a healthcare provider undertaking initial screening activities with rudimentary systems from which determinations about the diagnosis are made and/or additional tests may be undertaken. Accordingly, this process relies strongly on the expertise of the healthcare worker who may be inexperienced with some diseases/conditions, stressed, and/or otherwise not poised to provide optimal screening. As a result, the accuracy of the final diagnosis may be compromised, thereby causing unsatisfactory clinical outcomes due to corresponding treatments not being accurate.

SUMMARY

Systems, methods, and other embodiments relate to autonomous medical screening and recognition through the use of robotic devices. In one or more arrangements, a present approach can perform continuous tracking, integration, medical screening, and recognition/diagnosis according to medical marker development through the application of reinforcement learning. In general, disclosed approach trains a neural network to perform medical screening by analyzing clinical evidence of a patient. The information may be acquired from one or more robotic devices that interface with the patient to acquire health-related information in the form of direct observations of the patient. Thereafter, the neural network can be trained on the clinical assessment and diagnosis process. By learning when to ask for more information and when to provide a completed diagnosis/assessment, the neural network can make quicker decisions on fewer pieces of evidence whilst still ensuring an accurate clinical assessment.

In a further aspect, a disclosed screening system provides for a unique approach to a medical marker set that correlates with a network of medical sensors. The screening system can apply the medical markers to recognize and adjust a screening process through a screening robot. As a general consideration, the screening system may continuously monitor the set of medical markers according to available sensors and according to the acquired information in updating a diagnosis/assessment of a patient. In this way, the screening system can provide real-time determinations of a condition of the patient that are accurate to facilitate treatment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

1A is a diagram illustrating a robot for autonomous bioimaging, biosignal abstracting, clinical feature extraction, and clinical assessment of a patient.

1B is a flow diagram of a data process pipeline of autonomous medical screening and recognition.

Figure 2:
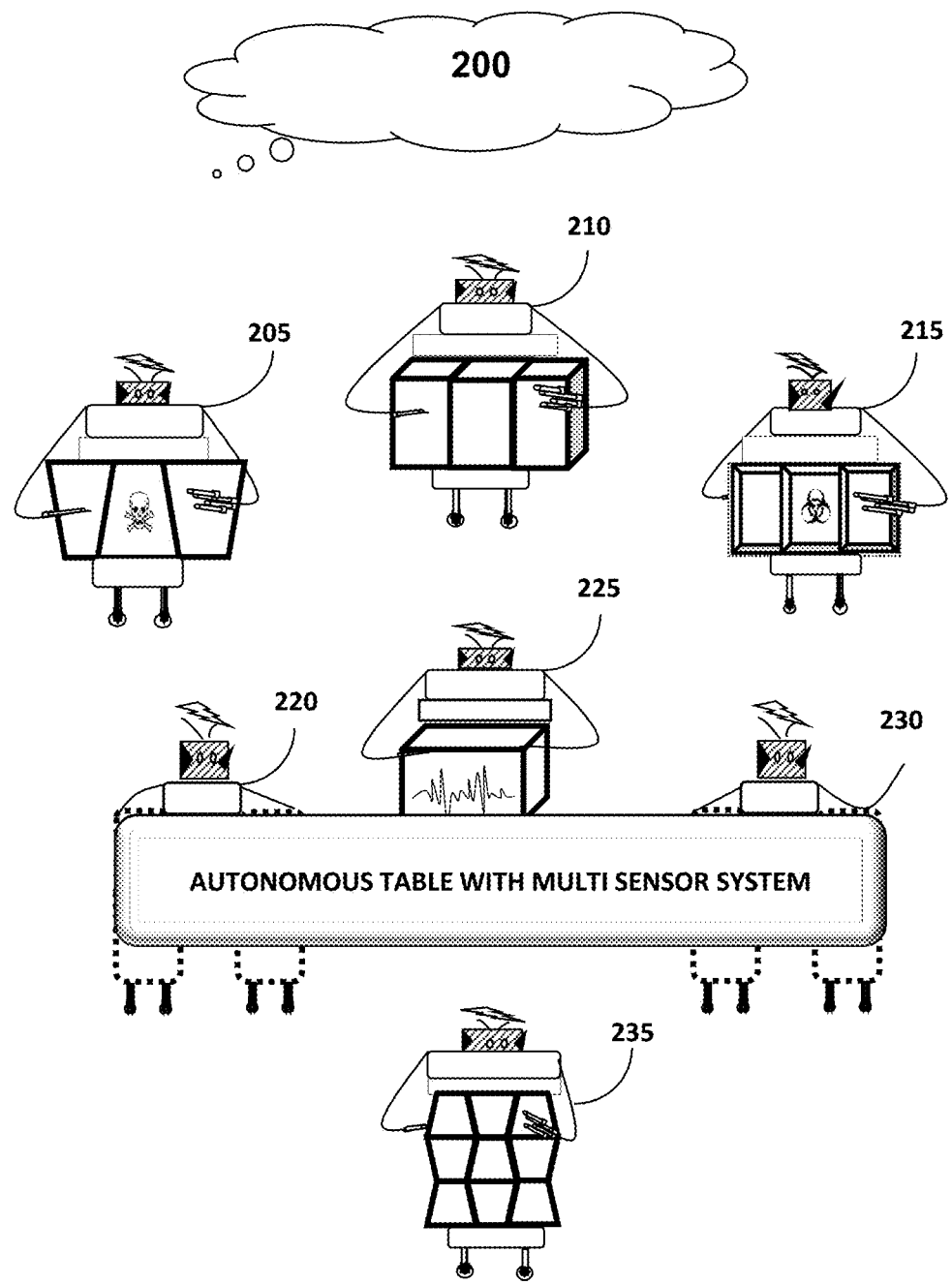

FIG. 2 shows an example cloud-based healthcare environment.

Figure 3:
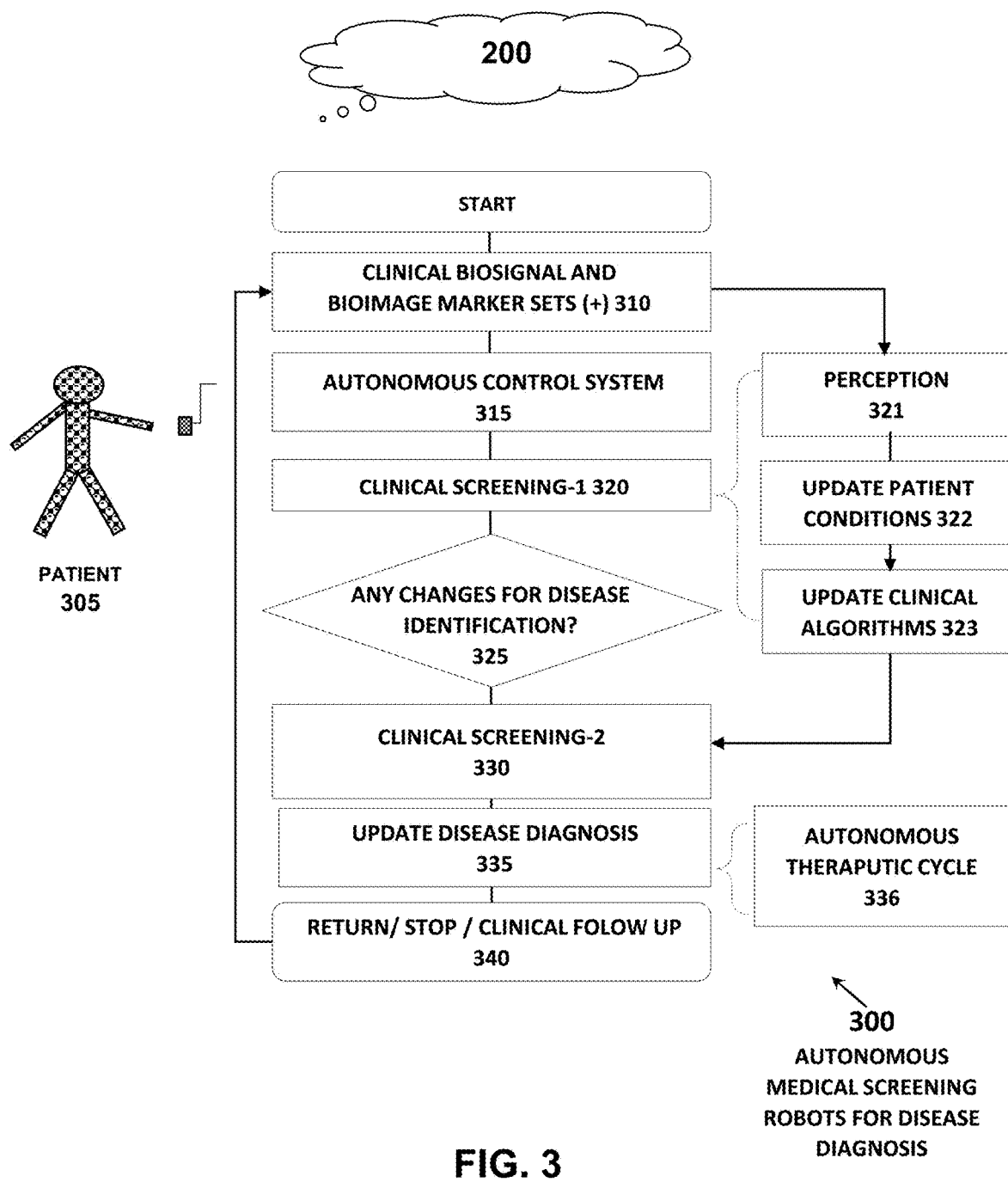

FIG. 3 is a flowchart illustrating an example process for screening, diagnosis, and learning for autonomous medical screening.

Figure 4:
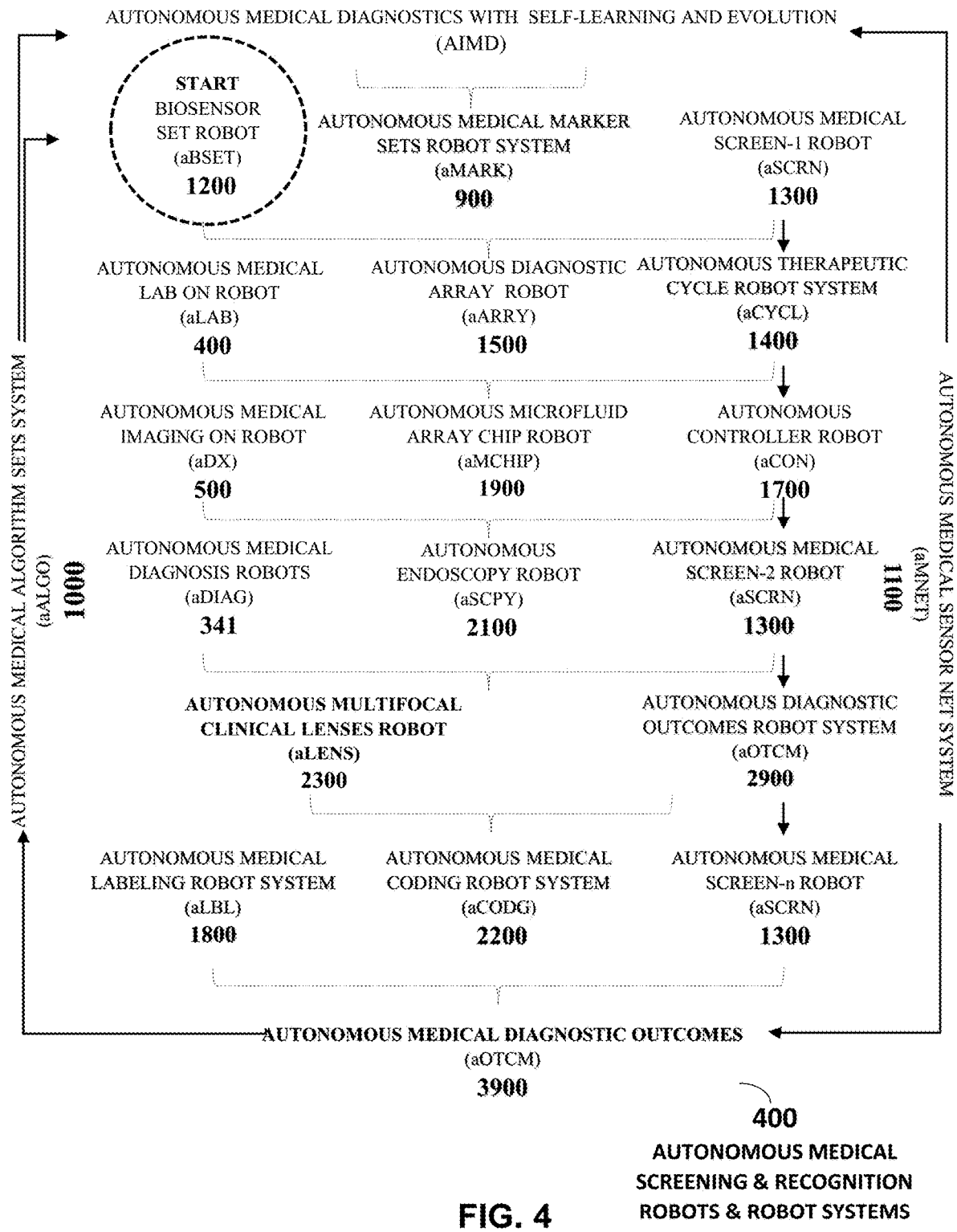

FIG. 4 is a diagram illustrating one example of autonomous medical diagnostics with self-learning and evolution.

Figure 5:
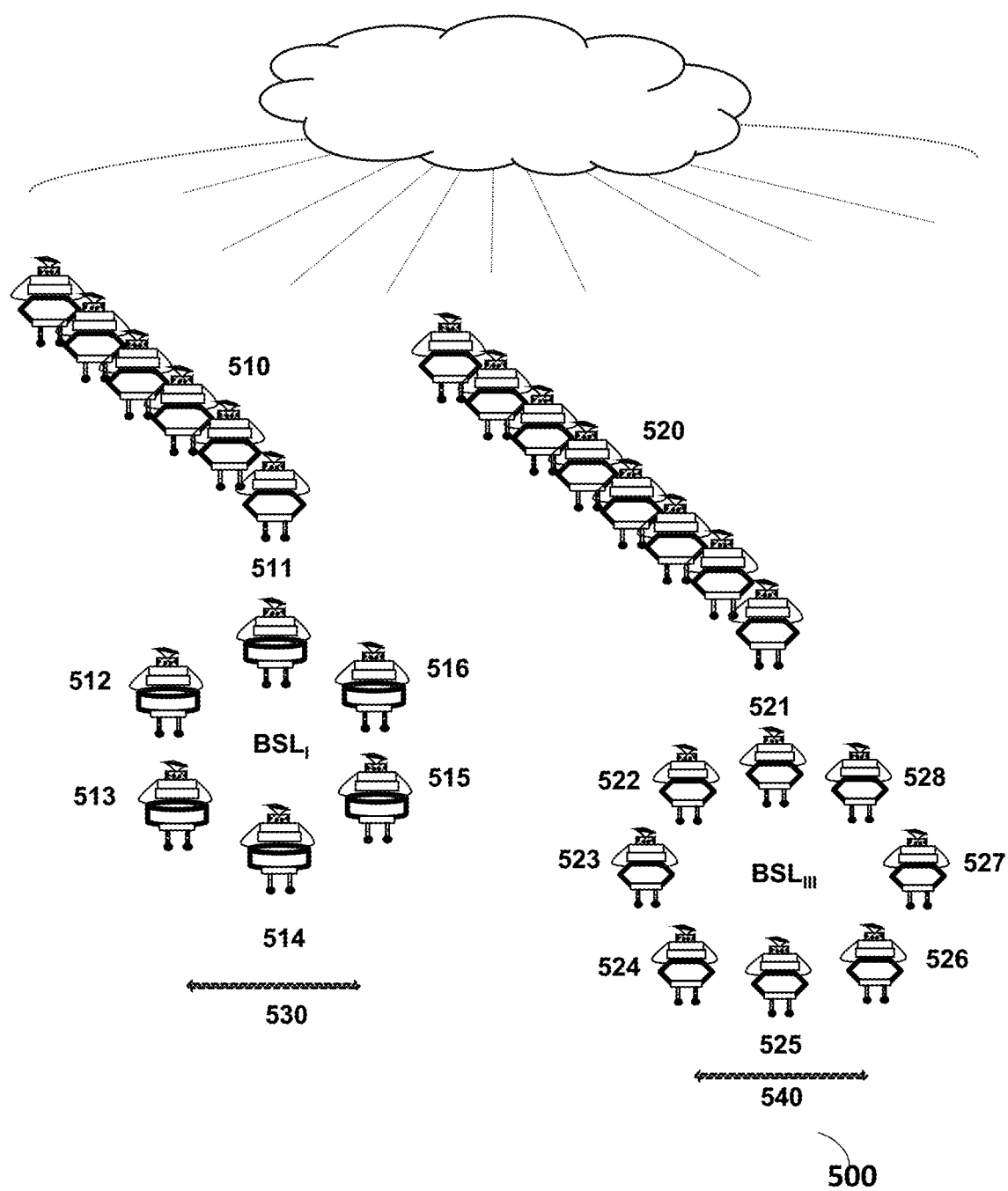

FIG. 5 illustrates one example of autonomous medical screening and recognition robots for multiplex and complex pathogen screenings.

Figure 6:
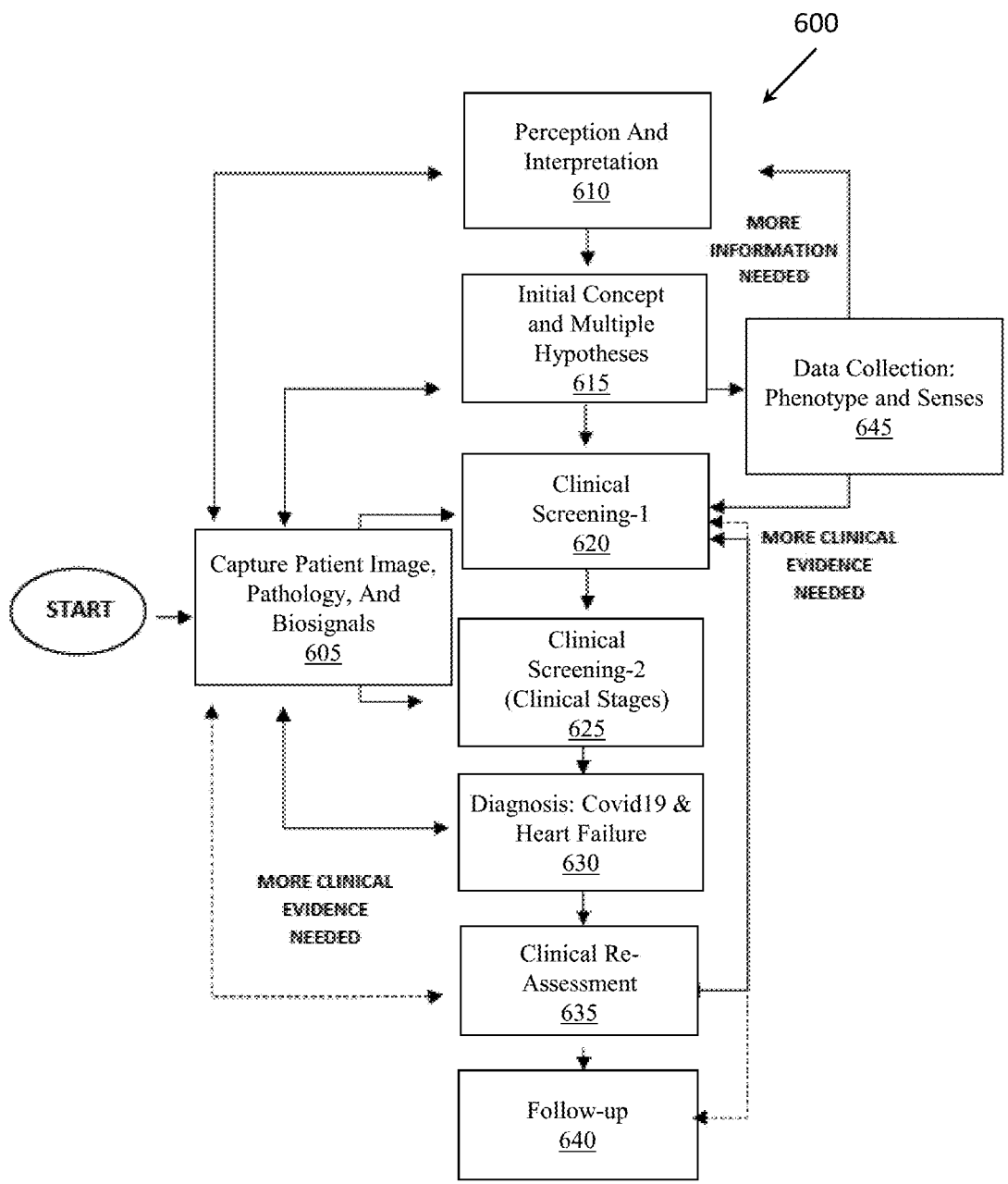

FIG. 6 illustrates one embodiment associated with screening with automated medical acquisition and analysis for cognitive screening in relation to a particular example, including COVID-19 with Heart Failure.

Figure 7:
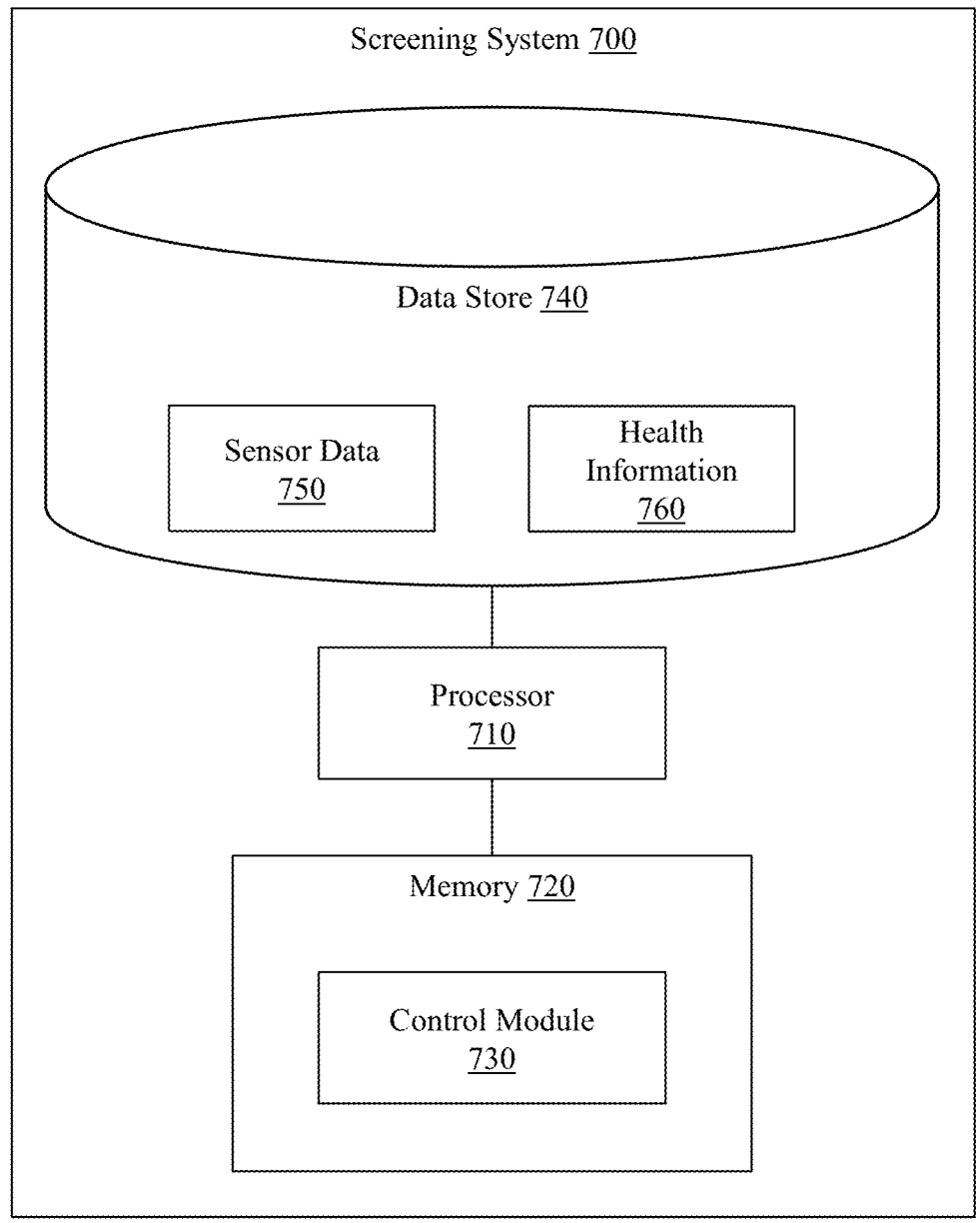

FIG. 7 illustrates one embodiment of a screening system that may be implemented within an autonomous robot and is associated with medical screening and assessment of a patient.

Figure 8:
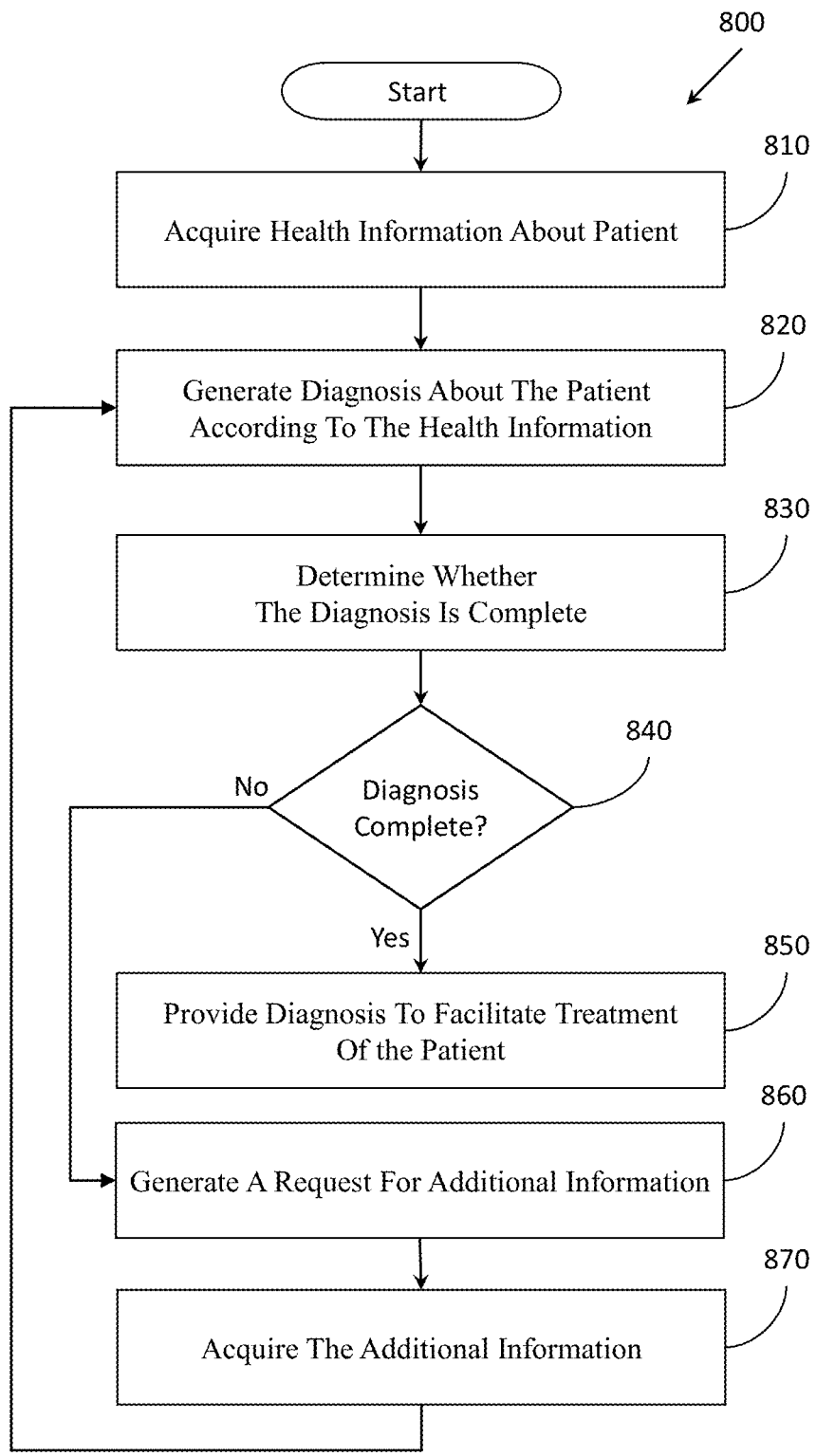

FIG. 8 is a flowchart illustrating one embodiment of a method associated with medical screening and assessment using an autonomous screening robot.

DETAILED DESCRIPTION

Systems, methods, and other embodiments are disclosed associated with an improved approach to medical assessment and screening that involves the use of machine learning to assess acquired information and the use of robotic screening to adapt the acquisition of the information. In one or more arrangements, a present approach can perform continuous tracking, integration, medical screening, and recognition/diagnosis according to medical marker development through the application of reinforcement learning. In general, disclosed approach trains a neural network to perform medical screening by analyzing clinical evidence of a patient. The information may be acquired from one or more robotic devices that interface with the patient to acquire health-related information in the form of direct observations of the patient. Thereafter, the neural network can be trained on the clinical assessment and diagnosis process. By learning when to ask for more information and when to provide a completed diagnosis/assessment, the neural network can make quicker decisions on fewer pieces of evidence whilst still ensuring an accurate clinical assessment.

In a further aspect, a disclosed screening system provides for a unique approach to a medical marker set that correlates with a network of medical sensors. The screening system can apply the medical markers to recognize and adjust a screening process through a screening robot. As a general consideration, the screening system may continuously monitor the set of medical markers according to available sensors and according to the acquired information in updating a diagnosis/assessment of a patient. In this way, the screening system can provide real-time determinations of the condition of the patient that are accurate to facilitate treatment.

In one aspect, the presently disclosed systems are associated with medical sensor sets that can include sensors, such as medical multifocal lens sets and other sensors that correlate with various medical markers to capture passive and active response pattern of the patients. The system implements a machine learning model in the form of a classifier to identify responses/conditions of the patient into various categories, such as normal, ischemic heart disease, coronary artery disease, stroke, lower respiratory infections, chronic obstructive pulmonary disease, cancers, diabetes mellitus, Alzheimer's disease and other dementias, dehydration, tuberculosis, cirrhosis, and so on.

As one example, the noted system may further perform clinical measurement deep reinforcement learning (eDRL) with the machine learning model for identifying a disease, condition, or injury. The eDRL is a form of training of the model to assign a clinical assessment to a patient. This approach can learn when insufficient information has been obtained about the patient and thus when to request additional health-related information. Accordingly, the model, once trained, can control the information gathering process (i.e., assessment and screening) and allow the screening system to generate accurate screening decisions according to less evidence, thereby improving the speed and accuracy of the screening process.

As a general background, medical screening and recognition as an examination or diagnostic process involves actively identifying disease for individuals and populations. This interaction may occur through robot interaction or manually by a trained healthcare professional. The goal of the screening process is to uncover enough clinical evidence to generate an informed decision about the condition of the patient. As such, the screening system via a screening robot plans tasks for the most efficient assessment and decision in relation to a diagnosis and treatment. Furthermore, screening is, in one or more aspects, an active process through which the screening robot generates inferences about the causes of the patient's condition and updates the patient condition/status (PCS) as health-related information changes. Robotic medical screening is a sequential decision-making domain, and reinforcement learning is the formal paradigm for solving problems in such domains. Autonomous healthcare bases treatment decisions on an overall understanding of a patient's health; robots observe how the patient responds to this treatment, and the process repeats. The robotic pathway includes 1. data acquisition, predominantly by extracting standardized, high-quality information with the smallest possible learning curve; 2. feature extraction, by discharging robots from performing tedious measurements on raw data; 3. interpretation, by digesting complex, heterogeneous data in order to augment the understanding of the patient status; and 4. decision support, by leveraging the previous steps to response to treatment or patients' outcomes. In particular, the patient condition/status (PCS) may be represented according to Equation (1):

$$\text{PCS} = E[\Sigma_{k=0}^{\infty} \gamma^k r_t(k) | s_k, a_k] \quad (1)$$

For example, one form of input can be information directly from the patient (biosignals and/or bioimaging's (PBB) (also called autonomous sensor sets)) for which the robot keeps track of the patient condition/status (PCS). The robot may track the PCS as PCS=$Sx_t$=Signal sets,$S \in R^{t*n}$, S referring to the patient condition/status (PCS), the set of all valid patient statuses. The robot processes the patient diagnosis-treatment-response assessment at $a_t$ with being the set of all treatment responses (action/response of the robot treatment). The patient condition/status encodes the system dynamics, fully defined by the transition function P: $SxA \rightarrow \delta$ (S), which gives the probability P(s'|s,a)=probability of Diagnostic-Treatment Outcomes (DTO) to transition to patient statuses given that the robot performed a treatment in patient status according to equation (2):

$$\text{DTO} = P(s_{t+1} = s' | s_t = s, a_t = a) \quad (2)$$

In one embodiment, the system defines a set of signs and symptoms for a disease, disorder, condition, syndrome or another aspect of the patient with, for example, biosignals and bioimaging through a reward signal (R): $SxAxS \rightarrow R$, here defined as a path from a patient status-treatment response pair to a real value, e.g., positive, or negative reward, which may be defined as (0, 1) and that may be returned at each time step to the robot. θ indicates the weights associated with the common input layer or treatment and clinical outcomes, Č represents the weights associated with the additional state-value layers (treatment and clinical outcomes) and Ă indicates the weights associated with additional advantage layers (diagnostics), and Ň indicates the weights associated with additional advantage layers (outcomes). Ď indicates the weights associated with the diagnostics with Q-value decomposed into patient current state-value.

In one embodiment, a robot is an entity that performs actions in relation to a patient and responses in relation to the patient, given its current patient status and a policy, a function that gives the probability of an action/response when in a particular patient status. The set of action/responses/treatments that a robot takes and the set of patient statuses that are consequently visited constitute a clinical path=$S_0, A_0, R_1, S_1, A_1, R_2 \ldots$. The goal of training a reinforcement learning robot is to learn a function, called the optimal policy that maps a robot's patient status to a specific action/response/treatment so that the reward received by the robot is maximized in expectation across interactions. γ is a discounted factor such that $0 \leq \gamma < 1$. To evaluate the quality of a particular patient state or diagnostics-treatment pair, it is possible to define two value functions. In particular, under a policy π, the value function of the patient state is calculated as $V\pi(S) = E[R_t | s_t = s, \pi]$.

In one embodiment, the system includes Q-learning (Q-L), which is a form of model-free, value-based reinforcement learning. It takes inspiration from dynamic programming and methods of Temporal Differences (TD). Two main classes of model-free algorithms can be implemented: a) policy-based method, which learns the policy directly; and b) value-based method, which learns one or several value functions to guide the robot policy toward a high reward path. Various embodiments may use a variant of Deep Q-Learning (DQL). In DQL, the robot does not learn a policy function directly but instead learns a proxy patient status-treatment value function DTO. This function approximates an optimal function DTO, defined as the maximum expected return achievable by any policy "a" which is the overall possible path given that in a patient status the robot performs action/response and the rest of the path $\tau$ is generated by following "n" denoted as $\tau \sim \pi$.

$$DTO = \max_{\pi} E_{\tau \sim \pi}(R(\tau \mid S_0 = s, a_0 = a)) \quad (3)$$

and update DTO by one step using:

$$DTO = R(\tau \mid S_0, a_0) = r(s_0, a_0) + \sum_{(s,a,r,s',a) \in B}^{\infty} \gamma^t r(s_t, a_t) \quad (4)$$

In one embodiment, the return function is, therefore, a weighted sum of rewards over the path $\tau$. The weighted outcome $\gamma \in [0,1]$ called the discount factor. The discount factor encodes the notion that sequences of action/responses are usually finite, and one gives more weighted outcome to the current reward. Q (s, a) has an optimal substructure and can be written recursively using the Bellman Equation, which treats each decision step as a separate sub-problem:

$$DTO = r(s, a) + \gamma \sum_{s'} p(s' \mid s, a) \max_{a'} Q(s'a') \quad (5)$$

This function encodes the value of performing a particular action/response as the sum of the immediate reward and the weighted outcome of expected rewards obtained over the future path. The future path is generated by a greedy policy ($\epsilon$) that selects the action/responses that maximize Q at each time step. Q learning tries to optimize the overall gain of future rewards for an action (best treatment). A Q-table is gained as the final clinical screening outcome indicating the particular treatment to take at a particular clinical state. In general, the robot takes the action at which maximum Q-value is obtained.

In one embodiment, during DQL, clinical diagnostics tuple-memories $E_i = (s, a, r, s', \gamma)$ of the robot's interaction with its patient are usually stored in a memory (M). Each record is composed of an initial patient status, the chosen action/response a, the received reward r, and a next patient status. During learning the robot samples records from past diagnostic assessments and learns the optimal Q-V function by minimizing the temporal difference error (TD-Error), defined as the difference between a target Q-V (or target patient status-action/response value) computed from a record $E_i$ and the current Q-V for a particular patient diagnostic-treatment pair (s, a)$\in$e:

$$DTO = \underset{Q}{\operatorname{argmin}} E \, e_{i \sim m} [Q^t(s, a \mid e_i) - Q(s, a)] \quad (6)$$

In one embodiment, the Q-Vs are updated iteratively from point samples until convergence or until a maximum number of steps is completed. At each iteration, the new Q-V is then defined as the learning rate of the robot:

$$DTO \leftarrow (1-a)Q(s, a) + aQ^t(s, a, \mid e_i) \quad (7)$$

In one embodiment, the value of Q for each patient status-action/response=diagnostic-treatment pair (s, a) to be stored. Hence, the classic Q-L algorithm falls short in settings with large patient status-action/response spaces, which constrain its potential use in healthcare. For example, in one implementation, the patient status space has configurations, corresponding to elements of the set of observable clinical evidence $\epsilon$. (Symptoms, signs, and risk factors with what works and what doesn't work in health care). The set $\epsilon$ may correspond to a subset of the clinical evidence, each of which is in one of three patient statuses: unobserved, observed present, or observed absent. In one or more embodiments, $\epsilon$ corresponds to the subset of clinical evidence. eDRL refers to a series of reinforcement learning algorithms that employ deep neural networks to approximate functions used by the robot. Neural networks amortize the cost of managing sizeable patient status-action/response space, both in terms of memory and computation time, and allow to learn complex non-linear functions of the patient status.

In one embodiment, Deep Q-Learning is an approach that uses a neural network to learn the Q-V of the patient diagnostic-treatment pairs $DT_\theta(s, a)$, with $\theta$ the parameters of the network. The core of the approach remains similar to classic Q-L but now uses stochastic gradient descent, rather than an explicit tabular update, to update $\theta$ following the gradient that minimizes the squared TD-error for each set. B is the size of the set used in the learning and $y_i^{DQN}$ is the output of the target clinical outcomes:

$$DT_\theta = \sum_{i=1}^{b} \frac{\pi'_a(u_{-a} \mid s)}{\pi^{t_i}_{-a}(u_{-a} \mid s)} \left[ (y_i^{DQN} - Q(s, u; \theta))^2 \right] \quad (8)$$

Accordingly, one or more aspects use a deep reinforcement learning approach to medical screening, where a model for controlling a robot learns an optimized policy based on expert-crafted clinical experimental results. The training and testing of the model uses a dataset of clinical experimental results that describe a patient presentation (eV$_i$), which represents an instance of clinical evidence. In one embodiment, each experiment eV$_i$ is associated with a number of robot screening decisions, where "A" is the set of potential screening decisions (the set of screening classes) and [m(a$_j$) $\in$ N] is the multiplicity of a decision (a$_j$) in the multiset (A$_i$). These robot screening decisions are prelabelled classifications for each clinical experiment.

$$eA_i = [\{a_j^{m(a_j)} \mid a_j \in A\}^n] \quad (9)$$

In one embodiment, a clinical experiment is associated with an average of standard deviation robot screening decisions; although other numbers of robot screening decisions may be used, the clinical assessment could be indicated by numbers with numbers either ascending or descending relative to a treatment direction.

In one embodiment, team robots are commonly used during training in screening and treatment on infectious disease dynamics scenarios, which may be referred to as a screen team robot swap in which the robot is exposed to a state midway through an alternative robot's path. This method has the potential to be significantly more scalable than human starts in large and complex environments; the value function ($V_i: X \rightarrow \mathbb{R}$) does not only depend on the individual policy of robot "I" but also on the policies of other robots, i.e., the value function for an agent "I" is the expected sum.

In one embodiment, the biosignals from patients are indicative of at least one of: patient fluid levels; a visualization; a mapping; mechanical properties; forces; pressures; muscle movement; blood pulse wave; an analyte presence, absence, level, or concentration; a blood oxygen saturation; a tissue inflammation state; a bioimpedance; a biocapacitance; a bioconductance; and electrical signals within the human body.

In one broad form, the validity of each of the curated clinical experiments can be evaluated independently by team robots prior to training. The screening decisions associated with each clinical experiment can be determined from a panel of robots. The patient status-action/response space is the set of all ordered pairs (status-response) being considered at each time step the robot performs one of the available action/responses, where "$A^+$" is the action/response of requesting more information. That is, the robot either asks for more information or makes one of the screening decisions-autonomous clinical screening (aSc) and autonomous recognition (aSe):

$$aSc+aSe+Plus=A^+ \qquad (10)$$

In one broad form, for each clinical experiment, the set of clinical evidence is mapped to a full patient status vector representation being the patient status-space. The patient status-space S is a vector having each element taking a discrete value of −1, 0 or 1. An element takes the value of −1 for known negative evidence (if the corresponding sign or risk factor is known to be absent, e.g., absence of fever), +1 for known positive evidence (e.g., diarrhea), and 0 for unobserved evidence. It is worth noting that robot-curated case cards are sparse, and many of the potential risk factors and symptoms are unobserved. At each new episode, the patient is configured with a new clinical experiment. The system processes the evidence and the screening decision on the experiment and returns an initial patient status $S_0$ with only one piece of evidence revealed to the robot, i.e., $S_0$ is a vector of all zeroes of size $S_0=|e|$ except for one element which is either 1 or −1:

$$aSc+aSe=S\{-1,0,1\}^{|e|} \qquad (11)$$

In one broad form, at each time step t, the patient receives an action/response $a_t$ from the robot. If the robot picks one of the screening actions/responses, the episode ends, and the robot receives a final reward. If the robot asks for more evidence, the system uniformly samples one of the missing pieces of evidence and adds it to the patient status vector $s_{t+1}$. During training, the robot is forced to make a screening decision if no more evidence is available on the experiment.

In one embodiment, the network is composed of four fully connected layers. The input layer takes the patient status vector $S_t \in \{-1,0,1\}$. The hidden layers are, in one approach, fully connected scaled exponential linear units' layers (x). The output layer uses a sigmoid activation function that keeps $I_{out}$ between 0 and 1 (restricting the output layer to a range between 0 and 1), thereby allowing for an easier process of reward shaping: by limiting the valid range for the rewards and treating them as probabilities of being the optimal action/response, rather than arbitrary scalar values:

$$aSc+aSe=x=1_{out} \in [0,1] \qquad (12)$$

In one embodiment, observations gathered by the robot are stored in a memory in which diagnostic assessments are prioritized by their temporal difference errors. Observations are replayed in sets of independent steps during optimization. After a burning period of n steps during which no learning occurs, the robot is then trained on a randomly sampled set after each action/response.

In one embodiment, to promote exploration during training, instead of using a greedy policy ($\epsilon$) approach, a small amount of Gaussian noise before the greedy policy picks the action/response with the highest where the operator $[a=A^+]$ is the Iverson bracket, which converts any logical preposition into a number that is 1 if the proposition is satisfied, and 0 otherwise:

$$aSc_t + aSe_t = \mathrm{argmax}_a(Q_\theta(s_t, a) + [a = A^+]N(0, \delta, i)) \qquad (13)$$

In one aspect, the noise is added to the action/response task and not to the screening action/responses because the goal of exploration is to evaluate when to stop rather than to gather information about specific screening rewards. Here, the screening action/responses are terminal, and all receive a counterfactual reward, which is independent of the action/response picked at each time step. The noise function is simple to execute, thereby providing a computationally efficient process while allowing effective exploration.

In one broad form, a difference with other reinforcement learning settings is that the rewards are not delayed, and akin to a supervised approach, each action/response receives a reward, whether the robot performed that action/response or not. At each time step, the reward received by the robot is then not a scalar, but a vector $R_a$, which represents the reward for each of the possible screening action/responses. The ask action/response does not receive a reward from the clinical conditions.

In one embodiment, the reward informs the robot's action/responses, rather than only the single action/response it selected as if it had performed all action/responses at the same time in separate counterfactual worlds. Reward shaping is important for this task, and many reward schemes have been tested to fairly promote the success of clinical metrics of appropriateness and safety. Trying to balance their relative importance into the reward proved to be less efficient than trying to match the distribution of the robot's screening decisions. Hence, for every clinical experiment, each screening decision is mapped to a reward equal to the normalized probability of that decision in the bag of robot decisions $A_i$. Namely, denoting of r corresponding to the reward for action/response (Dx=diagnosis, Tx=treatment):

$$Dx_a^r + Tx_a^r = r(a, s \mid A_j) \frac{P(a|A_j)}{\max P(a'|A_j)} \forall S \in S \qquad (14)$$

In one embodiment, screening action/responses are terminal; only the reward participates in the target Q-V for screening action/responses: $Dx_a^r+Tx_a^r=r_a=A^-_a \in A$, $Q^t(a, s|e_t)$ (15) Consequently, to account for the counterfactual reward, the system uses a vector form of the temporal difference update where all action/responses participate in the error at each time step. The reward for the action/response is treated differently. It is defined dynamically based on the quality of the current screening decision to encode the notion that the robot should be efficient yet careful to gather sufficient information. The difference between the current embodiment over the classic Q-L approach is the dynamic nature of $(Q_\theta^T)$, the large Q-V for the action/response task, which depends on the current Q-Vs of the screening action/responses. This dynamic diagnosis dependency is especially useful given that the stopping and the screening part of the present dynamic Q-L are being learned at the same time, and the value of asking for more information might change as the robot becomes better at screening.

In one embodiment, the robot stops according to the stopping criterion when its highest Q-V corresponds to a correct screening decision and does so reliably over the experiments. Assuming that the Q-Vs for the screening decisions are good estimates of the probabilities of particular screenings, the clinical measurement Deep Reinforcement Learning with Double Q-learning (eDDQN) approach is a heuristic that allows the robot to learn when best to stop asking questions given its current belief over the screening decisions. The eDDQN also can learn which clinical states are (or are not) valuable without having to learn the effect of each treatment at each clinical state since it's also calculating V(s) by decoupling the estimation.

$$Td_iTx_i(\theta) = E_{s,s,a,r,s'} \sim U(D)\left[\left(r + \gamma \frac{\max}{a'} Q(s', a'; \theta_i^-) - Q(s, a; \theta_i)\right)^2\right] \quad (16)$$

The "or" query is used by the robot. In practice, during an optimization cycle for a sampled memory $E_i$ in the set, the Q-Vs for the starting patient status and following patient statuses are computed. Given the parameters of the neural network, for patient statuses, the maximum Q-V from the Q-Vs for the screening action/responses is referred to as:

$$Td^i(s, ask|e_i) = T'd'_m(s) + T'd'_m(s)Td_m(s') \quad (17)$$

In one embodiment, the origin of equation (17) for the target Q-V, we treat 0-values as probabilities and define the events T and T' as "the robot's choice is an appropriate screening" on the current patient status and next patient status, respectively. Writing the event T' as the negation of T, the probability is defined as $Q^t(s, ask|_e) = P(ask|s) = P$ (TVT'\s,s') that is, the probability of the event "Either the screening decision is not appropriate in the current patient status, or it is appropriate in the next patient status." The query can also be written as: P(T T'|s,s') = 1−P(T T'|s,s'), which shows that the OR query encodes a stopping criterion heuristic corresponding to the event: "The screening decision is appropriate on the current patient status, and not appropriate in the next patient status." If the Q-Vs for the screening action/responses are considered as probabilities.

$$DTO_p(t|s) = \Sigma_{a \in A} \pi(a|s) P(T|s, a) = Qm(s) \quad (18)$$

In one broad form, this allows us to convert probabilities into Q-Vs. The probability of an appropriate screening (dependent on the Q-V for that screening) is linked to the probability ground of the screening within the ground truth values (the curated list of correct screenings for the patient). Assuming the Markov property and ensuing conditional independencies:

$$DTO_p(X_{t=n}=x|X_t,X_{t-1},\ldots,X_{t-k}=P(X_{t+n}=x|X_t) \quad (19)$$

In one embodiment, the "and" query is used by the eDDQN. For this query, the Q-V target for the ask action/response is defined as:

$$TDO_\theta^t = Q'_m(s)(Q_m(s') + Q'_m(s)Q'_m(s)Q_\theta^t(s, s^{+i})) \quad (20)$$

In one embodiment, the "or" query, which can be viewed as a particular parametrization of the reward and of the classic Q-L target, the "and" query has a form that may not be immediately comparable. In practice, for both queries, results can be improved by using the known appropriate screenings in each of the sampled memories to define the maximum Q-V associated with an appropriate screening for clinical outcomes:

$$DTO_j = DTO_p\left[\frac{k}{V_{m=j+1}}\left[T_m \wedge \frac{m-1}{n=j} \overline{T}_n\right] | S_j + S_J + 1\right] \quad (21)$$

In one embodiment, while the "or" query has provided the best results so far, the "and" query provides the best results regarding the stopping criterion out of the other tests. Theoretically, the "and" query should be more accurate, and the "or" query has been found to provide more appropriate and safe screenings. This is likely due to the fact that "and" query assumes a perfect model for assessing appropriate screenings. In this case, more evidence improves performance. In contrast, it has been found that obtaining more evidence can sometimes negatively affect performance (produce a less safe or less appropriate screening result). The "or" query takes this into account, learning to stop at the most appropriate time.

In one embodiment, the memory of the robot is inspired by prioritized clinical diagnostics replay memory with prioritized experience relay but does not rely on importance weighting. Instead, each memory tuple $E_i$ (s, a, r, s', γ) is associated with a priority that relies on the vector form of the counterfactual reward r and is equal to the absolute value of the mean TD-Error (i.e., the loss is known as the difference between the current estimate and a target value) over the actions/responses. The clinical diagnostics tuple $E_i$ is stored along with its priority $V_i$, which determines in which of the priority buckets the memory should be stored. The priority buckets have different sampling probabilities. In one embodiment, the sampling probabilities range from the lowest probability bucket to the highest.

$$DTO(V_i) = \left|\frac{1}{|A|}\right| \sum_{a \in A} Q_{\theta\theta}^T(s, a | e_i) - Q_\theta(s, a) \quad (22)$$

In one embodiment, involving population and individual patients on the medical sensor net, the clinical measurement determines the values of parameters of the model of organ function. The estimate is determined using the model of organ function with the values of the parameters. The model of medical marker sets for organ function is based on the optimization for the medical marker set through a selection of the model of organ function from a set of multiple models based on clinical outcome prediction accuracy, during a training phase. Alternatively, the model of organ function is based on the optimization for the medical marker set through clinical measurement deep reinforcement learning (eDRL) relating the measurements to the values of the parameters. The eDRL model marker set was trained with a loss function, including a first term for a difference of training measures to model output and a second term for a difference from a training medical marker set to a model medical marker set. In that way, the mapping between clinical data and model parameters considers the medical marker set to predict, thus reducing the manifold of potential parameter values to the space relevant to the patients.

In one embodiment, the screening team robot communicates with the patient via an interface. In one or more arrangements, the interface has two functions. The first function is to take communications input by the patient and turn the communications into a form that can be understood by the screening system. The communications may be text that is input into the robot. Alternatively, the communications may be spoken by the patient and recorded by the robot, for instance, via a microrobot. The second function is to send the output of the screening system back to the robots.

In the present embodiment, the screening system and/or robot may use different approaches, such as Natural Language Processing (NLP). NLP is one example of the tools used to interpret, understand, and transform the input into a usable format. The screening system comprises a screening engine and a question engine. The question engine is configured to generate questions to obtain information regarding the patient clinical evidence (also referred to as health information of the patient herein). In this way, the screening system obtains evidence of potential medical conditions of the patient (e.g. in the form of positive or negative indications or certain symptoms or risk factors).

A screening engine, in one arrangement, is configured to assess the health information obtained so far and either 1) determine a screening classification for the patient or 2) prompt a question engine to issue one or more additional questions to obtain further evidence. Accordingly, the screening engine assesses whether sufficient evidence has been obtained to provide a reliable screening decision and, if not, requests further evidence. The question engine may be configured to determine the most effective question to ask in order to improve the accuracy of the screening decision and/or a subsequent diagnosis of the patient. To achieve this, the question engine may be configured to refer to a knowledge base that is, in one or more arrangements, a lookup table, a database, a heuristic, a neural network model, or another functional element that can derive the appropriate questioning path according to prior answers to accurately focus the screening.

In at least one approach, the question engine may be implemented through a probabilistic graphical model that stores various potential symptoms, medical conditions, and risk factors. The question engine may apply logical rules to the knowledge base and the graphical model to deduce current information (infer information from the input information, a knowledge base, and the graphical model). The question engine is configured to generate questions for the patient to answer in order to obtain health information to answer an overall question (e.g., "what is the clinical assessment"). A question may be selected in order to reduce the overall uncertainty within the system.

In the present case, the screening engine utilizes the question engine to determine a clinical assessment for the patient. The question engine selects a question by choosing the question that would most increase the value of information (i.e., that would most decrease uncertainty in the screening decision or in a subsequent diagnosis). The patient's answer is then passed back to the screening engine that uses this current health information to either determine a clinical assessment for the patient or prompt a further question.

In one approach, the knowledge base is a structured set of data defining a medical knowledge base. A knowledge base is a set of facts and rules that the system has access to for determining a clinical assessment. The knowledge base describes, in one approach, an ontology that relates to the medical field (e.g., sets of conditions and related medical marker sets). In general, the knowledge base permits the components of the system to communicate via a common language. The knowledge base keeps track of the meaning behind medical terminology across different medical systems and different languages. In particular, the knowledge base includes, in one or more arrangements, data patterns describing a plurality of semantic triples, including a medical-related subject, a medical-related object, and a relation linking the subject and the object.

The presently disclosed approaches may further implement a method for determining a clinical assessment using a robot and involving a process of questioning a patient that is alert and able to provide cogent answers as a part of an overall screening and assessment process. The method may be implemented by a screening system or may be implemented by another form of computing system. The method starts with the system issuing one or more questions to the patient. The patient can provide answers via an input device, such as a personal electronic device, or through an input device of the screen system that may be a microphone, a keyboard, or another human-machine interface device. The answer is electronically communicated to a screening engine within the system, which may convert the input into a format appropriate for the screening engine, for instance, by mapping the input to a vector of clinical evidence.

The clinical evidence is a vector where an entry relates to a specific observation of a given attribute of the patient (an individual piece of evidence, i.e., health information). When the screening engine receives the evidence, it then calculates the Q-Vs for the potential action/responses (the potential screening action/responses and the asking action/response). This is determined by inputting the patient status (the current evidence vector including a set of clinical evidence of the patient) into a neural network trained to predict a Q-V for the action/response based on the parameters of the network. The action/response is then selected. The system then determines whether the selected treatment was a screening action/response. If not, then action/response was an asking action/response (an information retrieval action/response), and the method loops back to issue a subsequent request for information in the form of a follow-up question. If a screening action/response is selected, then the system outputs the screening class of the patient.

The above methodology allows the system to make appropriate screening decisions when sufficient evidence has been obtained and to ask additional questions where more evidence is needed. This relies on a trained neural network that is configured to predict patient status-action/response values for potential actions/responses.

Figure 1A:
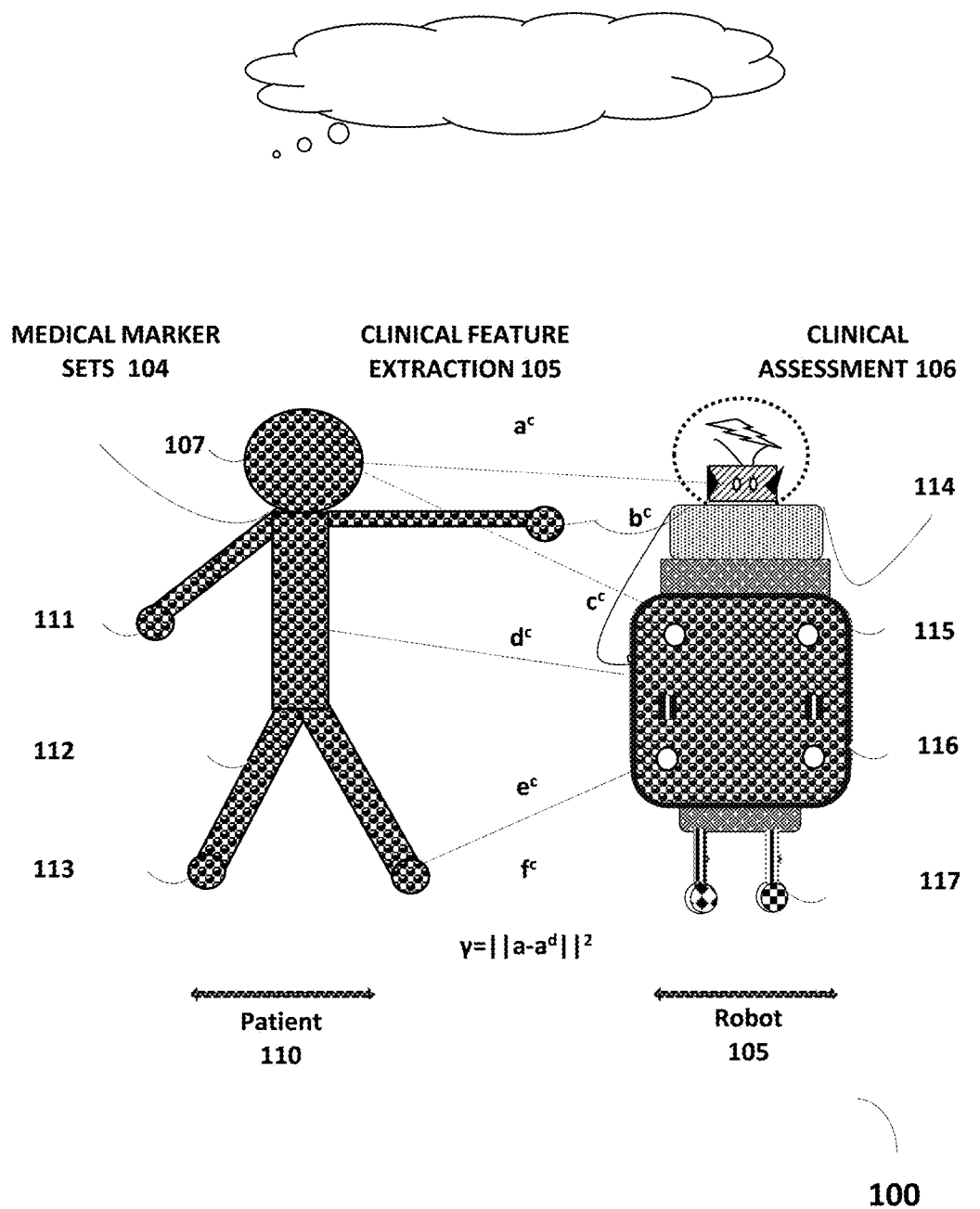

FIG. 1A is a diagram 100 illustrating a robot 105 for autonomous bioimaging, biosignal abstracting, clinical feature extraction, and clinical assessment of a patient 110. Biosignals are generated by, for example, mostly vital physiologic phenomena and provide valuable information regarding the status and function of a biological system. Being time or space-time records of biological events, biosignals, as well as bioimages, come from diversified sources (such as cerebral 107, cardiovascular 111, muscular 112, respiratory 113, etc.) and find a wide range of applications, including the identification of indicators of disease, and clinical outcomes to computational self-learning and evolution tools aimed at detecting, processing, and analyzing biomedical signals and images. The diagram 100 illustrates autonomous bioimaging and biosignal abstracting 111, clinical feature extraction 112, and clinical assessment 113. The characteristic of artificial intelligence that can extract valuable information allows the opportunity to acquire and use information not perceived by humans. As eDRL algorithms depend on the amount and quality of data, collecting proper datasets is a step to begin eDRL screenings. Extracting valuable information may involve a type of artificial neural network architecture associated with a medical marker set such as ac, bc, cc, dc, ec, fc, gc, and he etc. that compresses original raw data to a smaller size and a biorecoder 116 that restores the compressed information into original data. The biocoder 114 learns to minimize reconstruction error ($\gamma=\|a-ad\|2$) that represents a difference 115 between original data-discrete actions (ad) and reconstructed data-continuous action (ac), which are the output from the biorecoder 116.

The information compressed by a bioencoder is a latent variable. If the original data is restored with the latent variable of a size smaller than the original data, it indicates that the bioencoder identified the pattern or internal structure of the data and extracted the primary features. In such a case, the latent variable extracted by the bioencoder can be used as input data for other machine learning models like clustering or classification. In addition, monitoring patient biosignals and bioimaging in an autonomous multi-focused medical lens or a different power mode can involve using a plurality of photo transistors implemented by light absorption multi-layers that have different organic orientations derived from a solution process. Signal processing is a step for meaningful biorecoding and analysis of biosignals, which are highly perturbed in nature. Investigating AI-based solutions to handle rich information about biological systems and molecules at various resolutions, all the way from atomic-level to physiological-level can be an important aspect not only for diagnosis, but also for prognosis and treatment. In one aspect, a convolutional neural network fits the convolutional matrix to extract a feature map that is a type of matrix containing valuable information for discriminating between medical marker sets, and a biocoder extracts information useful for reconstruction of raw data from the patient. Although the features are derived regardless of medical marker set information, principal information included in the raw signal is obtained that can be used in other machine learning algorithms to predict or detect medical marker sets.

Figure 1B:
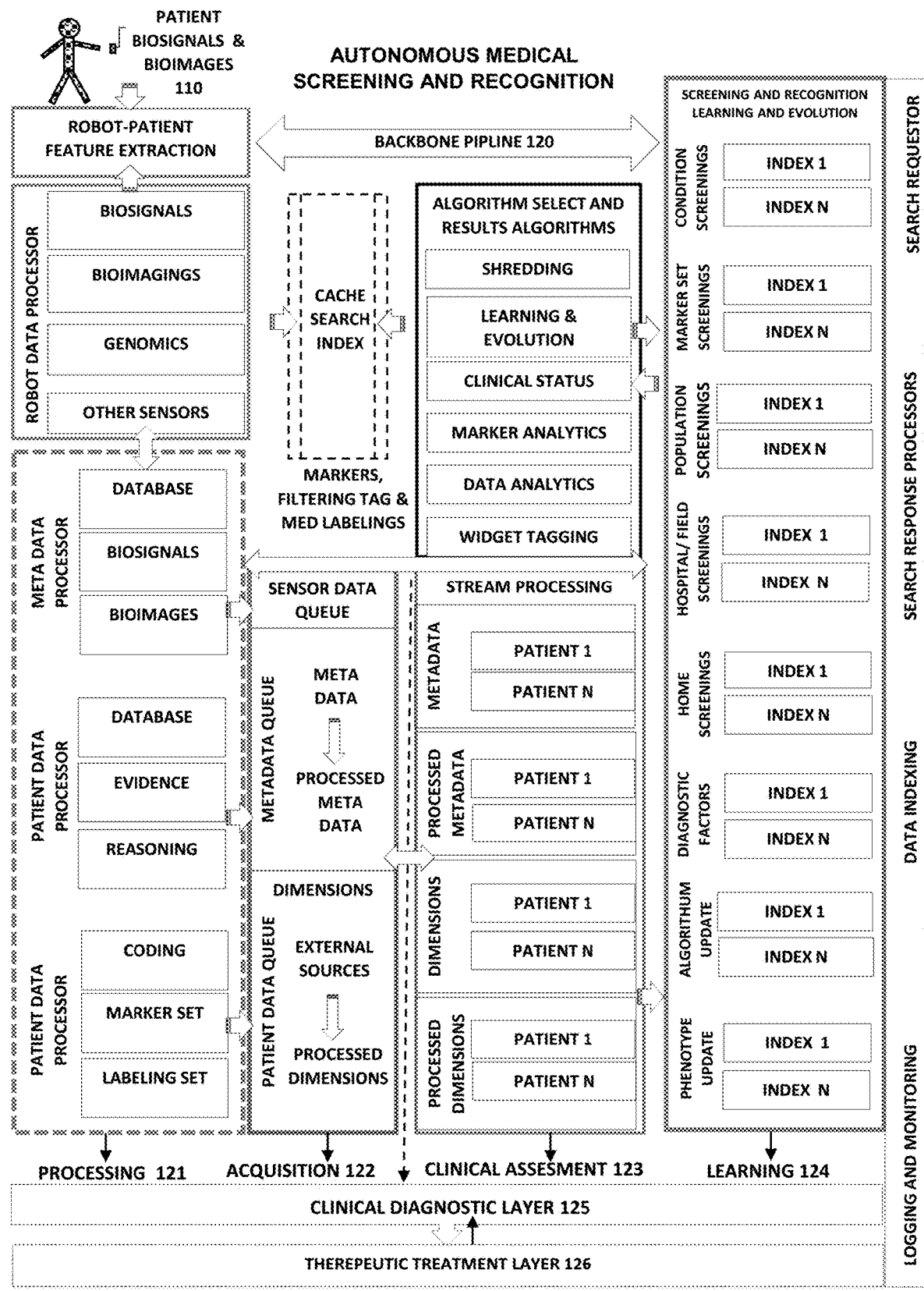

With reference to FIG. 1B, a flow diagram is illustrated of a data process pipeline 120 associated with autonomous medical screening and recognition. Autonomous healthcare should develop healthcare projects and initiatives based on a consistent architecture, including a medical network layer, clinical diagnostic layer 125 (e.g., including a sensor layer, a perception layer, etc.), a processing layer 121, a gateway layer, a platform layer, a therapeutic treatment layer 126 (e.g., therapeutic medical device layer), and a security layer. The clinical diagnostic data pipelines are complex things with many devices and many dependencies. The purpose of a data pipeline is to move data from an origin to a destination. The multitude of clinical data origins introduces complexity from the start with a variety of structures and platforms, and with velocity ranging from a scheduled set to streaming data. Destinations are similarly diverse, with many different kinds of data stores and applications needing to receive data. Dataflow must be implemented to move clinical data from origin to destination, typically with clinical data transformation and integration occurring along the path. Autonomous data for healthcare, including patient condition biocoder 114, creates, and maintains an internal screening of the data ecosystem using robots, algorithms, and intelligent connections to healthcare semantics and provides awareness of data flows and stores, clinical data collection and refinement processes, data access processes, and patients. Processing of inputs (e.g., processing biosignals, bioimaging, and other sensor inputs) and processing AI inputs provides for plotting clinical data flow and therapeutic treatment processing paths while sending clinical therapeutic treatment instructions to execute software workflow. Diagnostic error avoidance can involve applying rules, schema change detection, conflict detection, and workload balancing algorithms for real-time pipeline navigation for clinical assessment 123. Continuous learning 124 may involve applying experience and example-based machine learning to improve health awareness with capabilities such as rare disease detection, new clinical symptom and sign identification, etc. and applies experience and example-based machine learning to improve patient health awareness and data understanding with capabilities, such as data type inference, best-fit database selection, automated response to schema changes, etc.

With reference to FIG. 2, an example cloud-based healthcare environment 200 in which a screening system (not illustrated) operates is shown. As shown in FIG. 2, the cloud-based healthcare environment 200 includes connections (e.g., wireless communication links) to a multiplicity of different autonomous robots that, for example, function as screening robots in the current instance. In general, the robots are configured to move, manipulate, and perform various tasks autonomously, which may be at the initial direction of the system 200 and/or the screening system. As one example, various ones of the robots (e.g., 205-235) are configured with multiple degrees of freedom to enable, through the movement of the robots, screening and assessment activities associated with a patient. The robots position themselves to provide the screening in desired locations (e.g., in a particular position relative to a patient). As shown in FIG. 2, the cloud-based healthcare environment 200 may include and control many different types of robots. FIG. 2 shows robots 205-235 arranged as a team of robots, which may be comprised of the noted robots 205-235 or may include further types of robots. The screening team can include specialized robots for leading a screening process, imaging, bio-signal acquisition, and so on. The team can generally be comprised of an arrangement of different robots that function symbiotically to provide screening and assessment in a particular manner.

Returning to the individual robots, the robots may each be configured with claws, opposable grapplers, or other instruments for effecting screening and/or therapeutic delivery. Broadly, the robots are configured with a combination of software and hardware that provide intelligence within the robots, including perception, understanding, planning, and so on, to actuate a particular included manipulator and other dynamic aspects of the robots in providing screening/assessment/care to a patient. To achieve interaction with a patient, various different ones of the robots include medical sensor sets. A medical sensor set is, in one approach, mounted at a fixed state relative to a base of a robot or other stationary reference point of a robot. Medical sensor sets are, for example, groupings of sensors that include sensors that provide sensor data, including images and/or other data related to shape, color, depth, and/or other features of patient(s). Thus, the sensors of a given set may include cameras (e.g., RGB cameras, infrared cameras, etc.), ultrasonic sensors, MMW radar, LiDAR, etc. In further aspects, the medical sensor sets include, for example, monographic cameras, stereographic cameras, and/or 4D laser scanners. In further arrangements, the sensors can include medical imaging acquired using optical microscopy, fluorescence microscopy, electron tomography, nuclear magnetic resonance, single particle cryo-EM, and X-ray crystallography, ultrasound, computed tomography (CT), magnetic resonance imaging (MM), positron emission tomography (PET), optical coherence tomography (OCT), and so on. Additionally, biosensor data from SERS, EEG, ECG, may also be acquired.

Dynamic clinical screening for preventive medicine, diagnostics, and therapeutic treatments, as implemented via the various robots, relies on sensor data collected by the robots to assist the robots in making informed clinical decisions and enabling automated patient care. From the collected sensor data, the screening system codes the perceived information to align with a format of defined markers so that the cloud-based system 200 can select one or more algorithms for treating a clinical diagnosis.

At the beginning of a clinical manifestation, real-time clinical evidence collected by the robot is processed, for example, by the screening system, along with a success signal indicating a readiness of the robot according to a position of the robot relative to the patient. A management system in combination with the screening system can then select and provide a particular algorithm over a communication network based, at least in part, on the clinical evidence. This may continue to be performed iteratively (e.g., at each healthcare delivery cycle of the robot) until the success signal is achieved (e.g., as determined based on a reward satisfying a criteria) and/or other criteria are met. The other criteria can be, for example, that a temporal duration of the clinical manifestations has satisfied a threshold (e.g., X seconds) or that a threshold quantity of healthcare delivery cycles (e.g., screening/assessment and therapy delivery) has occurred. At each separate iteration, the screening system is acquiring sensor data, including feedback about previous actions and changes in a condition of the patient, by which models may then adapt an assessment and diagnosis and select different algorithms and/or different therapies to evolve the care of the patient according to perceived changes.

Continuing with the collection of the sensor data and diagnosis of the condition of the patient, marker sets, and labeling involve, in one approach, a continuous, or at least semi-continuous, flow of clinical data (i.e., sensor data) and evolving screening/assessment along with treatments between the patient and the robots. In one aspect, the management system functions to iteratively reconfigure robots providing treatment and performing monitoring/screening of the patient according to the sensor data that provides feedback. In general, the reconfiguration of the robots includes selection of algorithms and refitting of modular bellies according to the sensor data and, in some cases, activation of additional and/or different robots. That is, as one example, where an active robot is administering a pharmaceutical to the patient and the patient is, for example, not responding to the pharmaceutical, the system may adapt the algorithm that is active to a different algorithm that provides a different pharmaceutical, a higher delivery rate of the pharmaceutical, and/or a higher dose of the pharmaceutical. In general, the different algorithms are specific to different treatments and embody specific protocols about the delivery of a given therapeutic/treatment.

With reference to FIG. 3, one embodiment of a method 300 associated with autonomous medical screening for disease diagnosis is illustrated. As shown in FIG. 3, the method 300 may be executed by a screening system that is located within a screening robot to screen/assess a patient 305. Alternatively, one or more of the noted functions may be executed as part of the cloud-based healthcare system 200. In any case, at 310, the screening system acquires clinical screening data. The clinical screening data may include many different forms of information acquired by the screening robot and/or other robots associated with the screening robot. As one example, the clinical sensor data can include bio-signals (e.g., heart rate, blood pressure, temperature, etc.), images (e.g., visual, x-ray, etc.), direct information provided by the patient 305 via spoken communications or direct inputs, and so on. As a general matter, the clinical sensor data encompasses a wide range of information that is envisioned as any information that may be useful in generating a diagnosis of a condition of the patient.

At 315, an autonomous control system for autonomous screening, recognition and diagnostic that is associated with the screening system may provide various communications to facilitate the method 300. For example, a therapeutic controller of the autonomous control system may include a processor, memory in electronic communication with the processor, and instructions stored in the memory. The instructions may be executable by the processor to cause the controller to transmit scheduling information for transmitting uplink control information in a first resource. The first resource spans at least portions of a set of transmission time intervals, transmits a downlink data sensor set data to be acknowledged via a feedback sensor set data in a second resource. The second resource is within one of the sets of transmission time intervals. The second resource may determine a communication resource for reception of feedback sensor set data based on the first resource overlapping the second resource. The first resource spans at least portions of the set of transmission time intervals, and the second resource is within one of the sets of transmission time intervals and receives the feedback sensor set data via the communication resource.

At 320, the screening system uses the clinical sensor data to perform clinical screening of the patient 305. That is, for example, the clinical screening at 320 may include perception 321, updating a patient condition 322, and updating clinical algorithms 323. This process results in an initial diagnosis of the patient 305 and the application of a therapy according to the clinical algorithms 323. As such, the arrow from 323 to block 330 illustrates how the present process is iterative and how the patient is monitored in real-time according to feedback to iteratively update information about the patient 305.

At 325, the system determines the occurrence of any changes in the disease identification from prior determination and proceeds with further screening at 330. The screening at 330 takes a similar form to the screening at 320, except according to any new information that may be obtained according to a determination that the prior screening identifies changes that induce further acquisition of information that may involve additional processes. In any case, at 335, the screening system updates a disease diagnosis for the patient 305.

At 336, an autonomous therapeutic cycle 336 is administered according to the updated diagnosis. The therapeutic cycle 336 is, for example, administered by a team of multifunctional robots that operate autonomously according to one or more medical algorithms to perform one or more therapies on the patient, including pharmaceutical and/or surgical procedures. As such, at 340, the method 300 loops back to the acquisition of clinical sensor data to support the iterative screening process in order to account for observed changes in the patient based on feedback to the delivered therapies.

FIG. 4 is a diagram 400 illustrating one example of autonomous medical diagnostics with self-learning and evolution. In at least one approach, a method includes generating, using a learning model, a diagnosis for a patient according to health information. Autonomous Healthcare Physical Systems (aHPS) are systems in which a mechanism is controlled or monitored by AI algorithms 1000. In autonomous healthcare physical systems, physical and software components are deeply intertwined, able to operate on different spatial and temporal scales, exhibit multiple and distinct behavioral modalities, and interact with each other in ways that change with patient conditions-tasks. Healthcare Systems of Systems (hSS) is a collection of independent systems integrated into a task-oriented or dedicated systems that pool their resources and capabilities together to create a new, more complex system that offers more functionality and performance with unique capabilities than simply the sum of the constituent systems 1100. Healthcare Specialized Robots (hSR) and Healthcare Team Robots (hTR) are autonomous multifunctional healthcare robots, comprising: a basic robot configured to attach to an interchangeable task-specific robot belly and systems for a variety of applications in healthcare, which integrate into a task-oriented or dedicated robotic system that pool their resources and capabilities together to create a new, more complex specialized robot and/or robot teams.

Appropriate robot teams and/or individual robots can be linked to deal with the needs of any particular task, including biosensor set 1200, autonomous medical marker sets 900, autonomous medical lab on a robot, autonomous medical imaging on a robot, autonomous therapeutic cycle robot system start 1400, autonomous microfluid array chip robot 1900, autonomous controller robot 1700, autonomous medical diagnosis robots 341, autonomous endoscopy robot 2100, autonomous medical screen-2 robot 1300, autonomous multifocal clinical lenses robot 2300, autonomous medical labeling robot system 1800, autonomous medical coding robot system 2200, autonomous medical diagnostic outcomes 3900, autonomous medical screen-2 robot 1300 etc. The approach includes providing the diagnosis to facilitate treatment of the patient with wide adoption standing diagnostics and treatment to its increasing accuracy, reliance, and intelligence. For instance, autonomous healthcare equipped with robust planning and decision-making systems that can assess a patient's condition through real-world, complicated, and uncertain scenarios. They are equipped to treatment and optimize clinical processing and drug delivery and dosages, avoiding diagnostics and treatment mistakes while also navigating to desired clinical outcomes. The integrated AI capabilities leveraged by these robot's stream data from multiple cameras and sensors to automate several processes, from patent condition detection to therapeutic treatment, with little human intervention.

FIG. 5 is a diagram 500 illustrating one example of autonomous medical screening robots for pathogen screenings and recognition. A pathogen is usually defined as a microorganism that causes, or can cause, disease, belonging to the class of bacteria, viruses, fungi, or parasites. The resulting infection may lead to mild-to-severe symptoms, the extreme being life-threatening. As shown in the diagram 500, the screening and recognition system, robot, and teams may include a basic robot and an autonomous healthcare platform. The screening and recognition team robot may include at least one prescreening robot, secondary screening robot, toxic screening robot, specialized screening robot, and biohazard screening robot. the medical screening robot. The screening and recognition team robot may further include a pathogen (bacteria and virus) diagnostic cycle system 510. The pathogen (bacteria and virus) analyzer diagnostic cycle system may include a pathogen (bacteria and virus) biosafety lab on robot (aBSL). The pathogen (bacteria and virus) may be used for specimen collection & processing procedures into target medical materials and undesirable medical materials. Processing patient specimen/medical materials may be received within the pathogen (bacteria and virus) diagnostic cycle system. The specimen collection & processing may then be pumped through the pathogen (bacteria and virus). The pathogen (bacteria and virus) screen may separate the positive and negative patient cells/tissues/organs. The positive patient cells/tissues/organs may be transmitted along a first pipe or hose. The negative patient cells/tissues/organs may be transmitted along another pipe or hose. The pathogen (bacteria and virus) screen diagnostic cycle system may transmit biological waste or negative specimens to the aBelly or to another suitable location. The pathogen (bacteria and virus) screen diagnostic cycle system may be used for robot-specific healthcare tasks that include metagenomics analysis to detect rare and novel pathogens and to uncover the role of dysbiosis microbiomes in infectious and chronic human disease, such as for COVID-19 screening and detecting.

Autonomous screening and recognition team robot with biosafety lab on robot (aBSL) is a robot that has the elements of the four biosafety levels for activities involving infectious microorganisms. The levels are designated in ascending order, by degree of protection provided to personnel, the environment, and the community. BSL-Robots enhance human safety, environmental protection, and address the risk of handling agents requiring increasing levels of containment. A biosafety level is a level of the biocontainment precautions required to isolate dangerous biological agents in an enclosed robot belly with a robot belly opening and closing knob unit. Each robot belly has installed a locking unit with robot ID sensor for robot belly lock and unlock. The opening and closing device of the robot belly for the robot belly may include: a knob unit provided in a robot belly housing of the robot belly and used to open a robot belly door from the robot belly housing; and a locking unit provided in the robot belly door and locking and releasing the robot belly door with respect to the robot belly housing in connection with the knob unit. Here, the knob unit may include a push button installed at an edge of the robot belly housing and exposed to an outside; a knob rod extended from the push button toward an inside of the robot belly housing; and an operation rod connecting with the knob rod to slide via an inclined surface and transmitting operation force to the locking unit through the slide. Robot belly must carry out specific self-decontamination in handling pathogenic and potentially lethal agents and be competent in handling infectious agents and associated procedures. All procedures involving the manipulation of infectious medical materials must be conducted within BSCs or other physical containment devices. Robot belly must be routinely self-decontaminated, as well as, after spills, splashes, or other potential contamination. Robot belly is decontaminated before repair, maintenance, or removal from the robot. The levels of containment range from the lowest biosafety level 1 (BSL-1) 510 to the highest at level 4 (aBSL-4) 520. This can include medical waste or samples of a microorganism, virus, or toxin (from a biological source) that can affect human health. It can also include substances harmful to other animals. Medical facility robot for biohazard screening includes a basic biosafety lab on robot, aBSL-1, aBSL-2, BSL-3, and aBSL-4 Robot.

Autonomous screening and recognition team robot with biosafety lab on robot (aBSL-1) 530 is a robot that has the elements suitable for work involving well-characterized agents not known to consistently cause disease in immunocompetent adult humans and present minimal potential hazard to personnel and the environment. BSL-1 robots are not necessarily separated from the general traffic patterns in the area. Robots typically contain open standard robot bellies for carrying out standard microbiological practices. Special containment equipment or facility design is not required but may be used as determined by appropriate risk assessment. The standard robot practices, safety equipment, and facility requirements apply to BSL-1. Standard robot Microbiological Practices.

Autonomous screening and recognition team robot with biosafety lab (aBSL-2) is a robot, which has the elements of the four biosafety levels for Biosafety Level 2 that is suitable for a robot involving agents that pose moderate hazards to personnel and the environment. aBSL-2 differs from BSL-1 in that procedures in which infectious aerosols or splashes may be created are conducted in robot bellies or other physical containment equipment. A robot for biological hazards, which are organisms, or substances produced by organisms, which pose a threat to human health. The major biological hazards are 1) bacteria (ex: *Salmonella* spp., Enterohaemorrhagic *Escherichia coli, Campylobacter jejuna, Yersinia enterocolitica, Listeria monocytogenes, Bacillus anthracia, Bacillus cereus, Staphylococcus aureus, Clostridium botulinum, Clostridium perfringens, Vibrio vulnificus, Vibrio parahaemolyticus*); 2) Virus (ex: hepatitis A virus, Norwalk viruses, Rotavirus); 3) Parasites (ex: *Toxoplasma gondii, Cryptosporidia, Giardia* spp., *Trichinella spiralis, Taenia solium, Anisakis* spp.). A team robot with biosafety lab (aBSL-2) is applicable to clinical, diagnostic, teaching, research, or production facilities where the robot handles indigenous or exotic agents that may cause serious or potentially lethal disease through the inhalation route of exposure.

Autonomous screening and recognition team robot with biosafety lab on robot (aBSL-3) 540 is a robot that has the essential elements of the four biosafety levels for Biosafety Level 3. It is applicable to clinical, diagnostic, teaching, research, or production facilities where work is performed with indigenous or exotic agents that may cause serious or potentially lethal disease through the inhalation route of exposure. Procedures involving the manipulation of infectious medical materials are conducted within the robot belly or other physical containment devices. A BSL-3 robot belly (e.g., as shown with robots 521, 522, 523, 524, 525, 526, 527, 528) has special engineering and design features. Practices, equipment, and facility requirements associated with the special safety robot belly apply to the BSL-3 robot. The robot belly is designed so that it can be easily cleaned and decontaminated and the robot belly inside surfaces should be sealed. Spaces around doors and ventilation openings should be capable of being sealed to facilitate space decontamination. The aBSL-3 facility design, operational parameters, and procedures are verified and documented prior to operation.

The BSL-a belly is characterized by having a security system such that in case of breakage of the USK, a disinfectant aerosol is automatically distributed in the belly, an automatic door barrier to the outside world is activated, and the aerosol is subsequently chemically neutralized. The BSL-a belly is generally characterized in that the belly includes HEPA filter exhaust air and lockable HEPA filter supply. BSL-a belly of the preceding claims is characterized in that the jobs to the belly are accepted in the middle of the belly. BSL-a belly of the preceding claims is characterized in that the entrances to the inner region to the belly through a lock takes place. BLS-a belly according to this invention is characterized in that the region of the negative pressure in the belly is held for pretreatment and storage.

The BSL-a belly is further characterized in that the standard belly is formed as an inclined left-bottom to allow the flow of liquids in a tank. The BSL-a belly can be combined with robots such as: lab on robot, diagnostic imaging on robot, pharmacy on robot, special care robot, robot cardiologist, robot elderly care, robot family robot, robot food safety quality specialist, robot intensive care, robot neonatal care, robot neurologist, robot obstetrician/gynecologist, robot ophthalmologist, robot otolaryngologist, robot pediatrician, robot obstetrician/gynecologist, robot ophthalmologist, robot otolaryngologist, robot pathologist, and robot pediatrician.

FIG. 6 illustrates an example of clinical screening and diagnosis for a patient having COVID-19 with Congestive heart failure. In general, various approaches discussed herein present a deep reinforcement learning approach for triaging patients using an autonomous medical screening robot. The autonomous medical screening robot may be created with medical marker set and medical sensor net to represent real-life cases, such as a patient having a dry, hacking cough; a full (bloated) or hard stomach; a loss of appetite or upset stomach (nausea); congestion or runny nose; feeling tired (fatigue) and having leg weakness when active; nausea or vomiting, diarrhea; new loss of taste or smell; rapid or irregular heartbeats (palpitations); shortness of breath; sore throat; swelling in the patient ankles, legs, and abdomen; and weight gain.

As shown in FIG. 6, the robot implements a multi-step process that begins with capturing health information about the patient at 605. At 605, the screening robot may capture patient images, pathology, and bio-signals. In general, the robot uses a medical sensor network outfitted in the robot itself or among other robots/devices assisting in the screening and assessment process. This information is then used in the other functions, as shown via the flowchart. In the instant example, the capture of sensor information describing the health of the patient at 605 can include asking questions of the patient and receiving responses thereto (e.g., when was the onset of your current symptoms), acquiring medical images (e.g., chest x-ray), acquiring bio-signals (e.g., EKG, blood pressure, heart rate, etc.), and other health-related information related to the condition of the patient.

At 610, the screening system via the screening robot performs perception and interpretation on the information collected at 605 in order to correlate the information with symptoms. That is, for example, the screening system may apply various functional elements (e.g., machine learning models) to the captured information to derive perceptions from which particular medical interpretations can be assigned. For example, the screening system may apply a particular model to the EKG information in order to determine characteristics of the patient's heart, a separate model to the x-rays or other images to identify a condition of an imaged area, and so on.

At 615, the screening system generates initial concepts and hypotheses according to the perceptions derived from the collected information. These initial hypotheses/conceptions may include conclusions of particular aspects identified in the data, such as the presence of congestion, palpitations, swelling, and so on. At 620 and 625, the screening system performs the screening process via one or more models to, for example, correlate the perceptions from the acquired information with known evidence markers. As such, the screening system, at 630, provides a diagnosis, which in the instant case is an indication of COVID-19 with heart failure. From this point, the screening system can perform reassessment and follow-ups at 635 and 640 to verify and follow up on a condition of the patient based on the delivery of therapies that correspond to the diagnosis. As shown at 645 and leading from 635/640, various determinations may induce feedback for additional clinical evidence (i.e., further acquisition of health information) when, for example, a condition changes or the provided information is not sufficient to make a determination.

The below discussion relates to the performance of a specific embodiment that involves using the noted robotic device to screen the patient and generate a diagnosis therefrom. In this example, a dataset including clinical experimental results was used, with each experiment being associated with a number n (e.g., 3.8) robot screening decisions given by medical doctors relying on medical history. This approach yields safe screening decisions in 94% of cases and matches robot decisions in 85% of cases. Furthermore, the robotic device learns when to stop asking questions leading to optimized decision policies requiring less evidence than supervised approaches and adapts to the novelty of a situation by asking for more information when needed.

Overall, this deep reinforcement learning approach can learn strong medical screening policies directly from patients, other robots and/or clinicians' decisions, without requiring robot knowledge engineering. This approach is scalable, inexpensive, and can be deployed in healthcare settings or geographical regions with distinct screening specifications, or where trained robots are scarce to improve decision-making in the early stage of care. The quality of the results is evaluated on a test set composed of previously unseen experiments, using three target clinical metrics: appropriateness, safety, and the average number of questions asked. During training, those clinical metrics were evaluated over a sliding window of experiments, and during testing, they were evaluated over the whole test set. For example: medical sensor set data with medical marker set data indicate: A normal left ventricular ejection fraction (LVEF) range from 55% to 70%. An LVEF of 65%, for example, means that 65% of the total amount of blood in the left ventricle is pumped out with each heartbeat. The patient EF (Ejection Fraction) can go up and down based on the patient heart condition and how well the patient's treatment works. Ejection Fraction (EF) %: 55% to 70%: Pumping Ability of the Heart: Normal; Level of Heart Failure/Effect on Pumping: Heart function may be normal, or the patient may have heart failure with preserved EF (HF-pEF).

Ejection Fraction (EF) %: 40% to 54%: Pumping Ability of the Heart: Slightly below normal; Level of Heart Failure/Effect on Pumping: Less blood is available, so less blood is ejected from the ventricles. There is a lower-than-normal amount of oxygen-rich blood available to the rest of the body. The patient may not have symptoms. Ejection Fraction (EF) %: 35% to 39%: Pumping Ability of the Heart: Moderately below normal; Level of Heart Failure/Effect on Pumping: Mild heart failure with reduced EF (HF-rEF). Ejection Fraction (EF) %: Less than 35%: Pumping Ability of the Heart: Severely below normal; Level of Heart Failure/Effect on Pumping: Moderate-to-severe HF-rEF. Severe HF-rEF increases the risk of life-threatening heartbeats and cardiac desynchrony/desynchronization (right and left ventricles do not pump in unison).

Patient Heart Failure Types Identification: Heart failure with preserved left ventricular function (HF-pEF). If the patient has HF-pEF, the patient's EF is in the normal range because the patient's left ventricle is still pumping properly. The doctor will measure the patient's EF and may check the patient heart valves and muscle stiffness to see the severity of the patient heart failure. Heart failure with reduced left ventricular function (HF-rEF). If the patient has an EF of less than 35%, the patient has a greater risk of life-threatening irregular heartbeats that can cause sudden cardiac arrest/death. If the patient's EF is below 35%, the doctor may talk to the patient about treatment with an implantable cardioverter defibrillator (ICD) or cardiac resynchronization therapy (CRT). The robot may also recommend specific medications or other treatments, depending on how advanced the patient heart failure is. Less common treatment options include a heart transplant or a ventricular assist device (VAD).

For example: given a set of screening decisions Ai, a screening a is defined as appropriate if it lies at or between the most urgent U(Ai) and least urgent u(Ai) screening decisions for each clinical experiment. There are four heart failure stages (Stage A=high risk for developing HF, B=Asymptomatic HF, C=Symptomatic HF and D=Refractory End-Stage HF). The stages range from "high risk of developing heart failure" to "advanced heart failure. For instance, if an experiment has two ground truth screening decisions [A, C] from two different robots, the appropriate screening decisions are [A, B, C]. A screening decision is considered safe if it lies at or above u(Ai), the least urgent screening decision in Ai. For instance, in the above example of an experiment having two ground truth screening decisions [A, C], the safe screening-treatment decisions are [A, B, C, D]. Correspondingly, safety can be defined as the ratio of the robot's screening-treatment decisions that were safe over a set of clinical experiments.

The robot is trained to decide when best to stop and make a screening decision. Accordingly, the average number of questions can be used to assess the performance of the robot. The average number of questions is taken over a set of experiments. In the present analysis, it varies between 0 and 23, an arbitrary limit at which point the robot is forced to make a screening decision.

Accordingly, by learning when best to stop asking questions given a patient presentation, the eDDQN is able to produce an optimized policy, which reaches the same performance as supervised methods while requiring less evidence. It improves clinician policies by combining information from several robots for each of the clinical presentations. One of the reasons to use the Dynamic Q-L is to ensure that the Q-Vs correspond to a valid probability distribution. Another immediate advantage of eDDQN is that it is able to treat the stopping heuristic as an inference task over the quality of the robot's screening decisions. Interpreting the screening action/responses' Q-Vs as probabilities allows us to rewrite the Q-V update as the solution to the inference query, which leads to the robot getting increasingly better through interaction and adapting dynamically as screening decisions improve during training.

With reference to FIG. 7, one embodiment of a screening system 700 is further illustrated. The screening system 700 is shown as including a processor 710. Accordingly, the processor 710 may be a part of the screening system 700, or the screening system 700 may access the processor 710 through a data bus or another communication path as a shared resource (e.g., a distributed processing environment). Thus, the processor 710 may communicate with the screening system 700 through a communication network or may be co-located with the screening system 700 (e.g., within a screening robot). In further aspects, the screening system 700 may include various controllers in addition to the processor 710 that control various subassemblies of a multifunction robot. In one embodiment, the screening system 700 includes a memory 720 that stores a control module 730. The memory 720 is a random-access memory (RAM), read-only memory (ROM), a hard-disk drive, a flash memory, or another suitable memory (either volatile or non-volatile) for storing the control module 730 and/or other information used by the screening system 700. The control module 730 is, for example, computer-readable instructions within the physical memory 720 that, when executed by the processor 710, cause the processor 710 to perform the various functions disclosed herein. Moreover, the screening system 700 is generally embedded within the multifunction robot to provide various controls and decision-making processes therein. As such, the screening system 700 may be operatively connected with a communication bus within the screening robot to facilitate various functions described herein.

Continuing with FIG. 7 and a general embodiment of the screening system 700, in one or more arrangements, the screening system 700 includes a data store 740. The data store 740 is, in one embodiment, an electronic data structure (e.g., a database) stored in the memory 720 or another electronic memory that is configured with routines that can be executed by the processor 710 for analyzing stored data, providing stored data, organizing stored data, and so on. Thus, in one embodiment, the data store 740 stores data used by the module 730 in executing various functions. In one embodiment, the data store 740 includes sensor data 750, health information 760, and other information used by the screening system 700.

In general, the sensor data 750 includes observations from sensors of the screening robot but may also include observations from additional screening/sensor robots that are activated in support of a screening/assessment process led by the screening robot. Thus, the sensor data 750 can include observations from medical sensors and other sensors that are not specific to medical uses. The medical sensors may be sensors of the screening robot that are providing observations of the patient, such as blood pressure monitors, heart rate monitors, temperature sensors, and so on. The sensors may also be general use sensors, such as cameras, microphones, and so on. In general, the sensors implemented by the screening robot and other robots in cooperation with the screening robot are not intended to be limited but may encompass a wide range of sensors in support of the screening/assessment process to provide accurate diagnoses.

To acquire the sensor data 750 about the patient, or at least a portion of the sensor data 750, the screening system 700 may include, or at least functions in cooperation with, a communication system. In one embodiment, the communication system communicates according to one or more communication standards. For example, the communication system may be wired, wireless, or a combination thereof. The communication system can include multiple different antennas/transceivers and/or other hardware elements for communicating at different frequencies and according to respective protocols, whether wired or wireless. The communication system, in one arrangement, communicates via a communication protocol, such as a WiFi, DSRC, V2I, V2V, or another suitable protocol for communicating between the screening system 700 and the respective robots. Moreover, the communication system, in one arrangement, further communicates according to a protocol, such as the global system for mobile communication (GSM), Enhanced Data Rates for GSM Evolution (EDGE), Long-Term Evolution (LTE), 5G, or another communication technology that provides for the screening system 700 communicating with various other systems and/or other robots (e.g., other screening robots in a team). In any case, the screening system 700 can leverage various communication technologies to provide communications to other entities and/or receive information from other entities, such as the sensor data 750, the health information 760, and so on.

The health information 760 is, in one or more arrangements, perceptions/observations based on the sensor data 750. That is, the control module 730, in one or more approaches, includes various machine learning models to process the sensor data 750 into meaningful observations. The machine learning models include, for example, detection, classification, and correlation models that analyze the different types of sensor data 750, such as images, and process the sensor data 750 into determinations, such as identified contusions, congested lung observations, ejection fractions, and so on. These determinations about the separate aspects of the sensor data 750 are further processed by the screening system 700 to provide determinations about the screening process (e.g., whether the screening is complete or not, and a diagnosis for the patient.

Additional aspects about autonomous screening and diagnosis using a screening robot will be described in relation to FIG. 8. FIG. 8 illustrates a flowchart of a method 800 that is associated with screening a patient to determine a diagnosis. Method 800 will be discussed from the perspective of the screening system 700 of FIG. 7 as implemented within a healthcare ecosystem that may include autonomous multifunction robots. While method 800 is discussed in combination with the screening system 700, it should be appreciated that the method 800 is not limited to being implemented within the screening system 700 but is instead one example of a system that may implement the method 800.

At 810, the control module 730 acquires the health information 760 about the patient using one or more sensors of the screening robot. For example, as noted, the control module 730 may control one or more sensors to acquire the sensor data 750 according to autonomous routines of the screening robot that function to control sensors of the screening robot itself and/or via sensors of other multifunction robots within a team of screening robots. In any case, once the control module 730 acquires the sensor data 750, the control module 730 can process the sensor data 750 into the health information 760 that represents aspects about a current condition of the patient.

In one approach, the control module 730 implements a learning model that is a deep q learning model (i.e., a particular neural network) that is trained according to a form of reinforcement learning. As explained in depth previously, the training may be dynamic (i.e., in real-time as the learning model is operating to provide screening and diagnoses). In any case, the learning model may function in cooperation with additional machine perception neural networks, such as convolutional neural networks (CNNs), recursive neural networks (e.g., long-short term models (LSTM)), and so on in order to transform the sensor data 750 into perceptions/observations about the patient. The learning model may form feature vectors from the health information 760 and process feature vectors to derive information about screening and diagnosis, which will be discussed further subsequently. In any case, it should be appreciated that the learning model directs the screening robot to perform selected acquisitions of sensor data 750 according to perceived conditions of the patient.

Furthermore, acquiring the health information 760 is performed in order to derive a diagnosis so that one or more treatments can be provided via, for example, one or more robots. As such, the acquisition of health information for the patient may extend beyond immediate sensors of the screening and/or team robots. For example, as outlined previously, the health information 760 includes at least perceptions/observations of the patient as derived from the sensor data 750.

Of course, in further arrangements, additional information may be included with the health information 760, such as health records for the patient, an urgency of the condition of the patient, the sensor data 750 itself about the patient (e.g., vitals, etc.), and so on. In any case, the health information 760 can be at least partially acquired from a remote system, such as a cloud-based healthcare system. The healthcare system can communicate the information to the screening robot to induce the screening robot to perform the screening/assessment and provide or at least assist in providing a diagnosis for the patient. It should be appreciated that the screening robot may repeatedly interact with the system 100 to, for example, provide updated information about the patient and receive updated treatment information in the form of adapted/new treatment plans. Moreover, while acquiring the sensor data 750 and the health information is discussed in a serial manner with other functions, it should be appreciated that, in general, the acquisition of the health information 760 via the sensor data 750 is occurring iteratively and in parallel with other processes, such as the performance of therapeutic delivery according to a treatment from, for example, a prior diagnosis.

At 820, the control module 730 generates a diagnosis for a patient according to the health information 760 acquired from at least the screening robot. As noted, the health information 760 includes the sensor data 750 about the patient and perceptions derived from the sensor data 750. In one or more approaches, the control module 730 derives the diagnosis using the learning model, which is, for example, a Deep Q learning network. Thus, the learning model can produce a Q-V representing a probability of a particular diagnosis, as previously outlined. The ability of the learning model to generate the diagnosis is based on the reinforcement learning using verified experiments of clinical examples. Thus, the learning model learns associates between various inputs in the form of health information, such as information 760, and can provide an output specifying an extent of confidence in one or more diagnoses. As a further aspect, the generation of the diagnosis at 820, while generally described as an initial diagnosis, may further be an updated diagnosis according to the acquisition of additional information and/or according to the delivery of one or more therapies. As previously stated, the described functions of method 800 may execute in parallel with prior iterations and/or other methods, such as methods associated with providing treatments.

At 830, the control module 730 determines whether the diagnosis is complete. That is, in one approach, the control module 730 determines whether the diagnosis generated at 820 is based on sufficient clinical evidence and has an adequate confidence to provide the diagnosis as a final determination. In one arrangement, the control module 730 compares a confidence value generated by the learning model to a diagnosis threshold in order to determine whether the diagnosis is incomplete. In general, the diagnosis threshold may indicate, for example, a minimum confidence interval for relying on the diagnosis as being accurate and thus complete or not. Thus, to satisfy the diagnosis threshold, the control module 730 compares the confidence value with the diagnosis threshold. Satisfying the diagnosis threshold may be determined in different ways but is generally defined according to an inequality such as <=, <, and so on. The exact form of the comparison for satisfying the diagnosis threshold may vary, but, as one example, the control module 730 may determine whether the confidence value is >= to the diagnosis threshold (e.g., >=85% confidence). The confidence value itself may be a Q-V.

At 840, the control module 730 makes a decision about how to proceed according to the prior comparison. Thus, when the control module 730 determines that the diagnosis is complete, then the control module 730 proceeds to provide the diagnosis at block 850. Otherwise, the control module 730 proceeds to generate a request to improve the diagnosis, as discussed at block 860.

At 850, the control module 730 provides the diagnosis to facilitate treatment of the patient. For example, in one approach, the control module 730 controls at least one treatment robot to perform a therapy on the patient according to the diagnosis. As further explanation, the control module 730 may electronically communicate the diagnosis to a multifunction robot that then implements one or more treatment algorithms to execute the delivery of particular therapy to treat the condition associated with the diagnosis. Thus, the communication of the diagnosis directly causes the additional robot to take action. In a further aspect, the screening robot may be further outfitted with components to perform one or more therapies and identification of the diagnosis as being complete, then causes the instant screening robot to execute an associated algorithm to provide treatment. In any case, the diagnosis generally induces action among one or more multifunction robots to provide treatment to the patient.

At 860, the control module 730 generates a request for additional information and to update the diagnosis according to the additional information. For example, when the diagnosis is incomplete, the original health information 760 may be inadequate or inaccurate. Thus, the control module 730 can apply a screening model, which may be inclusive of the previously described learning model or may be a secondary model, to assess the prior screening and diagnosis and determine how to best proceed with acquiring additional information. For example, the screening model may assess the health information 760 and associated sensor data 750 in relation to the diagnosis and confidence interval to determine which additional information should be acquired to improve the diagnosis. This determination may be further adjusted according to available resources, such as the availability of more sophisticated technologies, such as complex imaging systems, blood marker tests, procedures (e.g., biopsies, etc.), additional questions to the patient, and so on. As such, the control module 730 applies the screening model and derives a plan for the additional information that indicates what information to acquire in order to improve the determination of the diagnosis. The control module 730 can then communicate a request to the instant screening robot and/or an additional robot to perform additional screening on the patient. In this way, the screening system 700 can further focus the screening/assessment process to particular points of information without blindly requesting a broad spectrum of tests/procedures.

At 870, the control module 730 acquires the additional information as part of the health information 760. For example, multiple different circumstances may occur in relation to the additional information. As noted, the control module 730 may induce an additional screening robot to undertake actions in relation to the patient in order to acquire further sensor data 750. Alternatively, or additionally, the control module 730 may simply induce the screening robot to take additional measurements/observations of the patient, such as acquiring different angles of images, additional readings of bio-signals, extended readings of bio-signals, and so on. In any case, the control module 730 acquires the additional information from the instant screening robot or one or more other screening robots and proceeds to re-generate the diagnosis, as discussed at block 820. Further, it should be appreciated, that the acquisition of the additional information in the form of additional sensor data 750 further induces additional analysis of the sensor data 750 itself into observations/perceptions by applying the noted machine perception models. As such, the screening system 700 is able to perform an autonomous screening process on the patient using the noted learning approach in order to provide independent, autonomous, and self-learning screening and assessment of a patient, which improves the process of diagnosis and subsequent treatment to elevate clinical outcomes.

The described screening system and associated robotic device are, in one or more arrangements, part of an Autonomous Medical Screening and Recognition System (AMSRS), which can be implemented for various application areas, such as running a screening line, health-related (e.g., determining the root cause of a patient's heart failure), and so on.

Cognitive automation mimics patient behavior, which is in many ways more complex than the action/responses and tasks mimicked by current automation technologies such as robotic process automation (RPA). While RPA relies on basic technologies, such as screen scraping, macro scripts, and workflow automation, cognitive automation, on the other hand, uses more advanced technologies, such as natural language processing (NLP), text analytics, data mining, semantic technology, artificial intelligence (AI), and machine learning (ML) to make it easier to make informed decisions (e.g., for the patient workforce to make informed medical decisions). RPA is rules-based and works on the "if-then" principle. It is a process-oriented technology. Cognitive automation is a knowledge-based technology. Here, the machine goes through several patient-like conversations and behaviors to understand how patients talk or behave and defines its own rules.

Cognitive automation can interpret unstructured data, unlike the RPA processes, to build relationships and find similarities between the items by learning from association. For example, if an organization has thousands of unstructured invoices and purchase orders sitting in a database, cognitive automation tools can build relationships between the entities by asking questions such as: "Have I seen this quality before?" "How was it used earlier?" "How is it connected to what was seen earlier?" and so on. By asking these questions, the cognitive automation platform can interpret and process data with minimal or no patient supervision.

Embodiments of the screening system may implement cognitive automation. For example, a screening robot can leverage cognitive automation with AI techniques to analyze a patient's condition to determine a diagnosis. An embodiment of the AMSRS can deliver technology that autonomously orchestrates operations for an organization (e.g., a screening). The AMSRS leverages the best of AI, ML, NLP, data, and screening domain expertise to deliver real-time cognitive automation. An embodiment of the AMSRS can dynamically uncover opportunities to improve a patient's heart failure condition using AI, ML, and cardiac domain expertise. The AMSRS can predict cardiac risks and opportunities using real-time data and AI, proactively engage with the patients, and drive the execution of their decisions.

The AMSRS generates an audit trail of an occurrence of various conditions, e.g., problem conditions, and notifies a patient of such conditions. The patient can provide instructions to the AMSRS to take specific action/responses. The AMSRS can also have a working memory of past decisions and actions/responses taken by patients, departments, and role-specific functions. The AMSRS can generate recommendations for solving a specified problem, which the patient can accept, modify, or ignore to solve the problem. The recommendations can be generated based on the previous actions/responses taken for similar problems. In an embodiment, in generating a recommendation for a specified problem, the AMSRS can evaluate whether one or more previous recommendations for solving the specified problem was accepted, a reason for rejection of the recommendation if it was not accepted, the parameters that were changed if the recommendation was modified etc. In some embodiments, if the recommendation was not accepted or modified, the AMSRS evaluates the outcome of the action/response taken by the patient versus the outcome had the recommendation made by the AMSRS was accepted by the patient and presents the evaluation to the patient. Further, based on the evaluation of the outcome, the AMSRS adapts the recommendation, e.g., improves the recommendation for the next time if the outcome of the AMSRS recommended plan is not better than the patient action/response. In some embodiments, if the outcome of the AMSRS recommended plan is better than the patient action/response, the AMSRS can autonomously take the action/response on behalf of the patient to solve the problem and/or generate a notification indicating to the patient that the outcome of the previous recommendation would have been better than that of the action/response taken by the patient for solving a similar problem and recommend the patient to accept the AMSRS generated recommendation.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, Python, or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A screening system for autonomous screening and diagnosis using a screening robot, comprising:
    one or more processors; and
    a memory communicably coupled to the one or more processors and storing instructions that, when executed by the one or more processors, cause the one or more processors to:
    generate, using a learning model, a diagnosis for a patient according to health information acquired from at least the screening robot, the health information including sensor data about the patient and perceptions derived from the sensor data, wherein the instructions to generate the diagnosis using the learning model include instructions to generate the diagnosis as an initial probabilistic diagnosis, represented as a Q-value distribution, by a Deep Q-Learning (DOL) agent trained on multimodal medical data, including genomic profiles, wherein the DOL agent, leveraging predictive analytics, estimates future health risks and potential medical conditions to derive the initial probabilistic diagnosis;
    responsive to determining that the diagnosis is incomplete according to the Q-value distribution, generate a request for additional information that the DOL agent identifies based on action response pairs associated with unobserved evidence for the patient, wherein the instructions to generate the request includes selecting, from a set of available robots including the screening robot, a respective robot of the set of available robots to perform dynamic clinical screening and acquire the additional information;
    update the diagnosis according to the additional information; and
    provide the diagnosis to facilitate treatment of the patient by controlling at least one treatment robot to perform a therapy on the patient according to the diagnosis.

2. The screening system of claim 1, wherein the instructions to generate the diagnosis include instructions to apply the learning model to the health information according to a Deep Q learning network that produces a Q-value representing a probability of a particular diagnosis.

3. The screening system of claim 2, wherein the instructions to determine that the diagnosis is incomplete include instructions to determine whether the q-value satisfies a diagnosis threshold.

4. The screening system of claim 1, wherein the instructions to generate the request include instructions to determine the additional information and communicate the request to at least one of the screening robot and an additional robot to perform additional screening on the patient that acquires the additional information, wherein the additional information includes one or more of an additional modality and an original modality, and
wherein the instructions to determine the additional information for subsequent screening include instructions to use a screening model to assess the diagnosis and identify the additional information.

5. The screening system of claim 1, wherein updating the diagnosis includes analyzing the health information with the additional information according to the learning model to regenerate the diagnosis.

6. The screening system of claim 1, wherein the instructions include instructions to acquire the health information about the patient from one or more sensors of the screening robot, wherein the instructions to acquire the health information includes autonomously acquiring the health information by the screening robot according to perceptions of the screening robot in relation to the patient and in parallel with therapy delivery by one or more treatment robots.

7. The screening system of claim 1, wherein the instructions to control at least one treatment robot include instructions to implement an algorithm within the at least one robot according to the therapy to control the at least one robot to perform the therapy.

8. The screening system of claim 1, wherein the screening robot is a multifunction robot that functions autonomously and is configured with one or more sensors for performing screening.

9. A non-transitory computer-readable medium for autonomous screening and diagnosis using a screening robot and storing instructions that, when executed by one or more processors, cause the one or more processors to:
generate, using a learning model, a diagnosis for a patient according to health information acquired from at least the screening robot, the health information including sensor data about the patient and perceptions derived from the sensor data, wherein the instructions to generate the diagnosis using the learning model include instructions to generate the diagnosis as an initial probabilistic diagnosis, represented as a Q-value distribution, by a Deep Q-Learning (DQL) agent trained on multimodal medical data, including genomic profiles, wherein the DOL agent, leveraging predictive analytics, estimates future health risks and potential medical conditions to derive the initial probabilistic diagnosis;
responsive to determining that the diagnosis is incomplete according to the Q-value distribution, generate a request for additional information that the DOL agent identifies based on action response pairs associated with unobserved evidence for the patient, wherein the instructions to generate the request includes selecting, from a set of available robots including the screening robot, a respective robot of the set of available robots to perform dynamic clinical screening and acquire the additional information;
update the diagnosis according to the additional information; and
provide the diagnosis to facilitate treatment of the patient by controlling at least one treatment robot to perform a therapy on the patient according to the diagnosis.

10. The non-transitory computer-readable medium of claim 9, wherein the instructions to generate the diagnosis include instructions to apply the learning model to the health information according to a Deep Q learning network that produces a q-value representing a probability of a particular diagnosis.

11. The non-transitory computer-readable medium of claim 10, wherein the instructions to determine that the diagnosis is incomplete include instructions to determine whether the q-value satisfies a diagnosis threshold.

12. The non-transitory computer-readable medium of claim 9, wherein the instructions to generate the request include instructions to determine the additional information and communicate the request to at least one of the screening robot and an additional robot to perform additional screening on the patient that acquires the additional information, wherein the additional information includes one or more of an additional modality and an original modality, and
wherein the instructions to determine the additional information for subsequent screening include instructions to use a screening model to assess the diagnosis and identify the additional information.

13. The non-transitory computer-readable medium of claim 9, wherein updating the diagnosis includes analyzing the health information with the additional information according to the learning model to regenerate the diagnosis.

14. A method for autonomous screening and diagnosis using a screening robot, comprising:
generating, using a learning model, a diagnosis for a patient according to health information acquired from at least the screening robot, the health information including sensor data about the patient and perceptions derived from the sensor data, wherein generating the diagnosis using the learning model includes generating the diagnosis as an initial probabilistic diagnosis, represented as a Q-value distribution, by a Deep Q-Learning (DOL) agent trained on multimodal medical data, including genomic profiles, wherein the DOL agent, leveraging predictive analytics, estimates future health risks and potential medical conditions to derive the initial probabilistic diagnosis;
responsive to determining that the diagnosis is incomplete according to the Q-value distribution, generating a request for additional information that the DOL agent identifies based on action response pairs associated with unobserved evidence for the patient, wherein generating the request includes selecting, from a set of available robots including the screening robot, a respective robot of the set of available robots to perform dynamic clinical screening and acquire the additional information;
updating the diagnosis according to the additional information; and
providing the diagnosis to facilitate treatment of the patient by controlling at least one treatment robot to perform a therapy on the patient according to the diagnosis.

15. The method of claim 14, wherein generating the diagnosis includes applying the learning model to the health information according to a Deep Q learning network that produces a q-value representing a probability of a particular diagnosis.

16. The method of claim 15, wherein determining that the diagnosis is incomplete includes determining whether the q-value satisfies a diagnosis threshold.

17. The method of claim 14, wherein generating the request includes determining the additional information and communicating the request to at least one of the screening robot and an additional robot to perform additional screening on the patient that acquires the additional information, and wherein determining the additional information for subsequent screening includes using a screening model to assess the diagnosis and identify the additional information.

18. The method of claim 14, wherein updating the diagnosis includes analyzing the health information with the additional information according to the learning model to regenerate the diagnosis.

19. The method of claim 14, further comprising:
acquiring the health information about the patient from one or more sensors of the screening robot, wherein acquiring the health information includes autonomously acquiring the health information by the screening robot according to perceptions of the screening robot in relation to the patient and in parallel with therapy delivery by one or more treatment robots.

20. The method of claim 14, wherein controlling at least one treatment robot includes implementing an algorithm within the at least one robot according to the therapy to control the at least one robot to perform the therapy.

* * * * *